US012726903B2

(12) United States Patent
Chen et al.

(10) Patent No.: US 12,726,903 B2
(45) Date of Patent: Sep. 1, 2026

(54) APPARATUS AND METHOD OF A LOW-POWER LISTENING MODE

(71) Applicant: GUANGDONG OPPO MOBILE TELECOMMUNICATIONS CORP., LTD., Dongguan (CN)

(72) Inventors: Xiaogang Chen, San Diego, CA (US); Wei Wen, San Diego, CA (US); Bo Lu, San Diego, CA (US); Bo Wang, San Diego, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 196 days.

(21) Appl. No.: 18/574,507

(22) PCT Filed: Apr. 18, 2023

(86) PCT No.: PCT/US2023/018930
§ 371 (c)(1),
(2) Date: Dec. 27, 2023

(87) PCT Pub. No.: WO2024/035449
PCT Pub. Date: Feb. 15, 2024

(65) Prior Publication Data

US 2024/0389023 A1 Nov. 21, 2024

Related U.S. Application Data

(60) Provisional application No. 63/396,337, filed on Aug. 9, 2022.

(51) Int. Cl.
*H04W 52/02* (2009.01)
*H04W 52/34* (2009.01)

(52) U.S. Cl.
CPC ....... *H04W 52/0229* (2013.01); *H04W 52/34* (2013.01)

(58) Field of Classification Search
CPC . H04W 52/0229; H04W 52/34; H04W 84/02; H04W 84/12; H04W 76/15;
(Continued)

(56) References Cited

U.S. PATENT DOCUMENTS

| | | | | |
|---|---|---|---|---|
| 11,690,012 | B2 * | 6/2023 | Naribole | H04W 52/0209 455/572 |
| 2011/0176465 | A1 * | 7/2011 | Panta | H04W 52/0235 370/311 |
| 2012/0207062 | A1 | 8/2012 | Corbellini | |
| 2015/0043409 | A1 | 2/2015 | Choi | |
| 2016/0330689 | A1 | 11/2016 | Park | |

(Continued)

FOREIGN PATENT DOCUMENTS

EP 3267738 B1 2/2021

OTHER PUBLICATIONS

International Search Report in the international application No. PCT/US2023/018930, mailed on Aug. 31, 2023, 4 pages.

(Continued)

*Primary Examiner* — Mohamed A Kamara
(74) *Attorney, Agent, or Firm* — BAYES PLLC

(57) ABSTRACT

According to one aspect of the present disclosure, a method of wireless communication of a first node is provided. The method may include generating, by at least one processor, a first low-power listening (LPL) frame with a first LPL subfield set to "enable." The method may include transmitting, by a communication interface, the first LPL frame with the first LPL subfield set to "enable" to a second node. The method may include enabling, by the at least one processor, an LPL mode after the first LPL frame with the first LPL subfield set to "enable" is transmitted to the second node.

10 Claims, 18 Drawing Sheets

600

(58) Field of Classification Search
CPC ......... H04W 52/0225; H04W 52/0216; H04W 52/0235; H04W 52/262; H04W 74/002; H04W 74/0816; Y02D 30/70
See application file for complete search history.

(56) References Cited

U.S. PATENT DOCUMENTS

| | | | | |
|---|---|---|---|---|
| 2017/0374621 A1 | 12/2017 | Itagaki | | |
| 2019/0320493 A1 | 10/2019 | Ang | | |
| 2023/0126846 A1* | 4/2023 | Ratnam ............. | H04W 52/0219 370/311 | |
| 2023/0319722 A1* | 10/2023 | Wang ................ | H04W 52/0248 370/311 | |

OTHER PUBLICATIONS

Written Opinion of the International Search Authority in the international application No. PCT/US2023/018930, mailed on Aug. 31, 2023, 10 pages.

"Standard for Information Technology—Telecommunications and information exchange between systems-Local and Metropolitan Area networks-Specific requirements—Part 11: Wireless LAN Medium Access Control (MAC) and Physical Layer (PHY) specifications; ANSI/IEEE Std 802.11, 1999 Edition (R2003)", IEEE Standard, IBEE, Piscataway, NJ USA, Nov. 30, 1998 (Nov. 30, 1998), pp. 1-528, XP068150169, DOI: 10.1109/IEEESTD.1998.8684613, ISBN: 978-0-7381-1659-4, paragraph [7.1.3.1.7], col. 11.2.1, col. 11.2.1.1; table 23.

Partial Supplementary European Search Report in the European application No. 23853173.5, mailed on Jul. 15, 2025.

Supplementary European Search Report in the European application No. 23853173.5, mailed on Oct. 7, 2025.

Thales Thales: "Cinterion PLSx3-WAT Command Set", PLSx3-W_ATC_V01.002d Sep. 3, 2021 Confidential /Released, ,Sep. 3, 2021 (Sep. 3, 2021), pp. 1-568, XP093395984, Retrieved from the Internet: URL: https://www. gs-m2m. de/fileadmin/Bilder/GSM_Module/Module/EMS31/ems31_us_atc_v5.1.2.0a. pdf.

First Office Action of the European application No. 23853173.5, issued on May 15, 2026.

* cited by examiner

Figure 8:
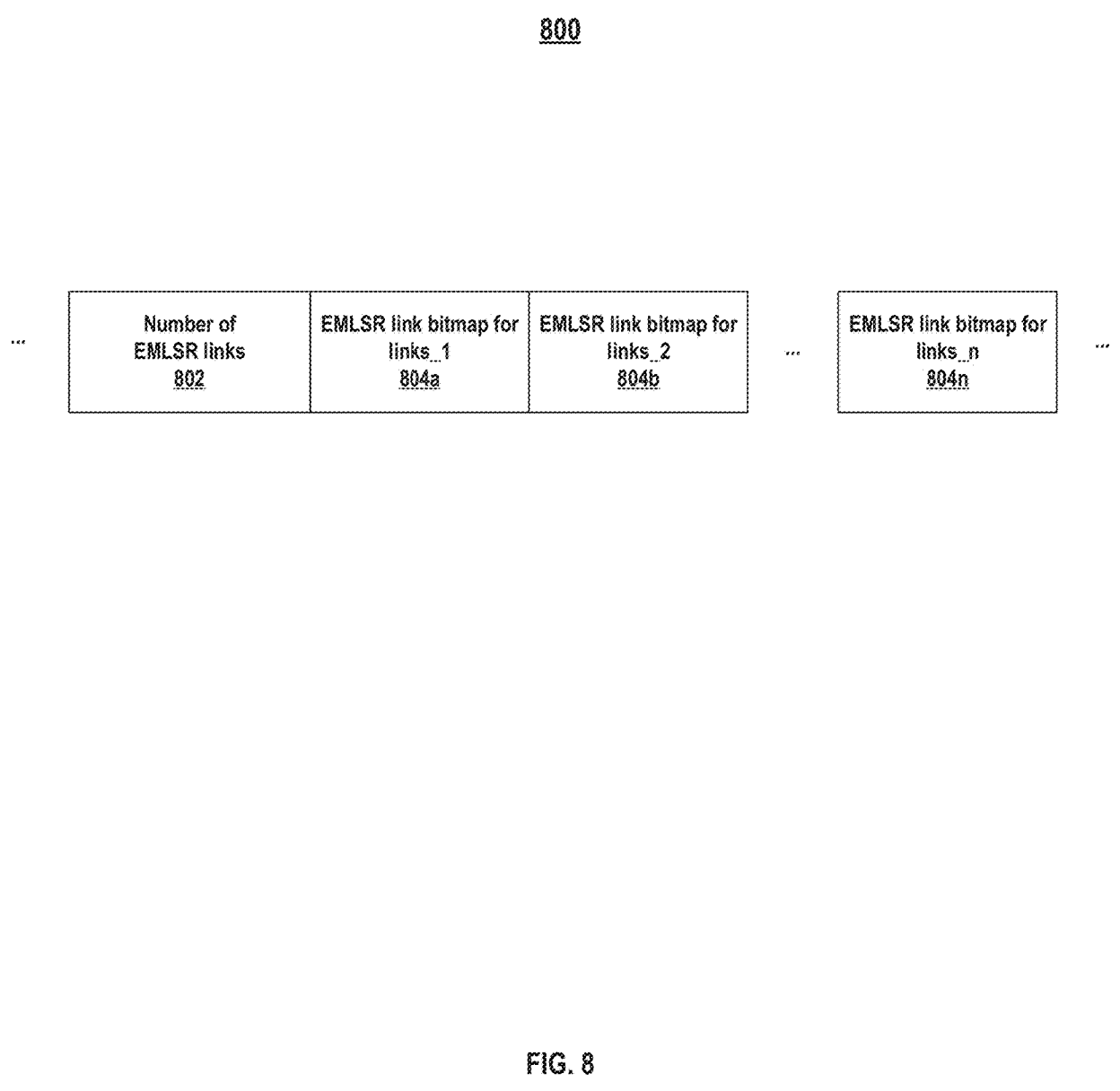

| Number of EMLSR links 802 | EMLSR link bitmap for links_1 804a | EMLSR link bitmap for links_2 804b | ... | EMLSR link bitmap for links_n 804n |
|---|---|---|---|---|

APPARATUS AND METHOD OF A LOW-POWER LISTENING MODE

CROSS-REFERENCE TO RELATED APPLICATIONS

This application is a national stage application of International Application No. PCT/US2023/018930, filed on Apr. 18, 2023, which claims the benefit of priority to U.S. Provisional Application No. 63/396,337, filed Aug. 9, 2022, entitled "LOW POWER LISTENING MODE," both of which are hereby incorporated by reference in their entireties.

BACKGROUND

Embodiments of the present disclosure relate to apparatus and method for wireless communication.

Wireless communication systems are widely deployed to provide various telecommunication services such as telephony, video, data, messaging, and broadcasts. In wireless local area network (WLAN) communication (e.g., such as Wi-Fi) and in cellular communication (e.g., such as the 4th-generation (4G) Long Term Evolution (LTE) and the 5th-generation (5G) New Radio (NR)), the Institute of Electrical and Electronics Engineers (IEEE) and the 3rd Generation Partnership Project (3GPP) define various operations for power-saving modes.

SUMMARY

According to one aspect of the present disclosure, a method of wireless communication of a first node is provided. The method may include generating, by at least one processor, a first low-power listening (LPL) frame with a first LPL subfield set to "enable." The method may include transmitting, by a communication interface, the first LPL frame with the first LPL subfield set to "enable" to a second node. The method may include enabling, by the at least one processor, an LPL mode after the first LPL frame with the first LPL subfield set to "enable" is transmitted to the second node.

According to another aspect of the present disclosure, a method of wireless communication of a first node is provided. The method may include identifying, by at least one processor, a first set of EMLSR links associated with an LPL mode and an active mode. The method may include transmitting, by the communication interface, a first indication of the first set of EMLSR links associated with the LPL mode and the active mode to the second node.

According to a further aspect of the present disclosure, an apparatus for wireless communication of a first node is provided. The apparatus may include at least one processor. The apparatus may include memory storing instructions. The memory storing instructions, which when executed by the at least one processor, may cause the at least one processor to generate a first LPL frame with a first LPL subfield set to "enable." The memory storing instructions, which when executed by the at least one processor, may cause the at least one processor to transmit the first LPL frame with the first LPL subfield set to "enable" to a second node. The memory storing instructions, which when executed by the at least one processor, may cause the at least one processor to enable an LPL mode after the first LPL frame with the first LPL subfield set to "enable" is transmitted to the second node.

According to still another aspect of the present disclosure, a method of wireless communication of a first node is provided. The method may include receiving, by a communication interface, a first LPL frame with a first LPL subfield set to "enable" from a second node. The method may include identifying, by at least one processor, the first LPL subfield in the first LPL frame is set to "enable."

According to still a further aspect of the present disclosure, a method of wireless communication of a first node is provided. The method may include receiving, by the communication interface, a first indication of one or more sets of EMLSR links associated with an LPL mode and an active mode to a second node. The method may include identifying, by at least one processor, the one or more sets of EMLSR links associated with the LPL mode and the active mode based on the first indication.

According to yet another aspect of the present disclosure, an apparatus for wireless communication of a first node is provided. The apparatus may include at least one processor. The apparatus may include memory storing instructions. The memory storing instructions, which when executed by the at least one processor, may cause the at least one processor to receive a first LPL frame with a first LPL subfield set to "enable" from a second node. The memory storing instructions, which when executed by the at least one processor, may cause the at least one processor to identify that the first LPL subfield in the first LPL frame is set to "enable."

These illustrative embodiments are mentioned not to limit or define the present disclosure, but to provide examples to aid understanding thereof. Additional embodiments are discussed in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 5 illustrates an exemplary LPL frame including a plurality of subfields, according to some embodiments of the present disclosure.

FIG. 8 illustrates a diagram of an exemplary EMLSR bitmap field in an enhanced-multi-link (EML) frame, according to some embodiments of the present disclosure.

Figure 1:
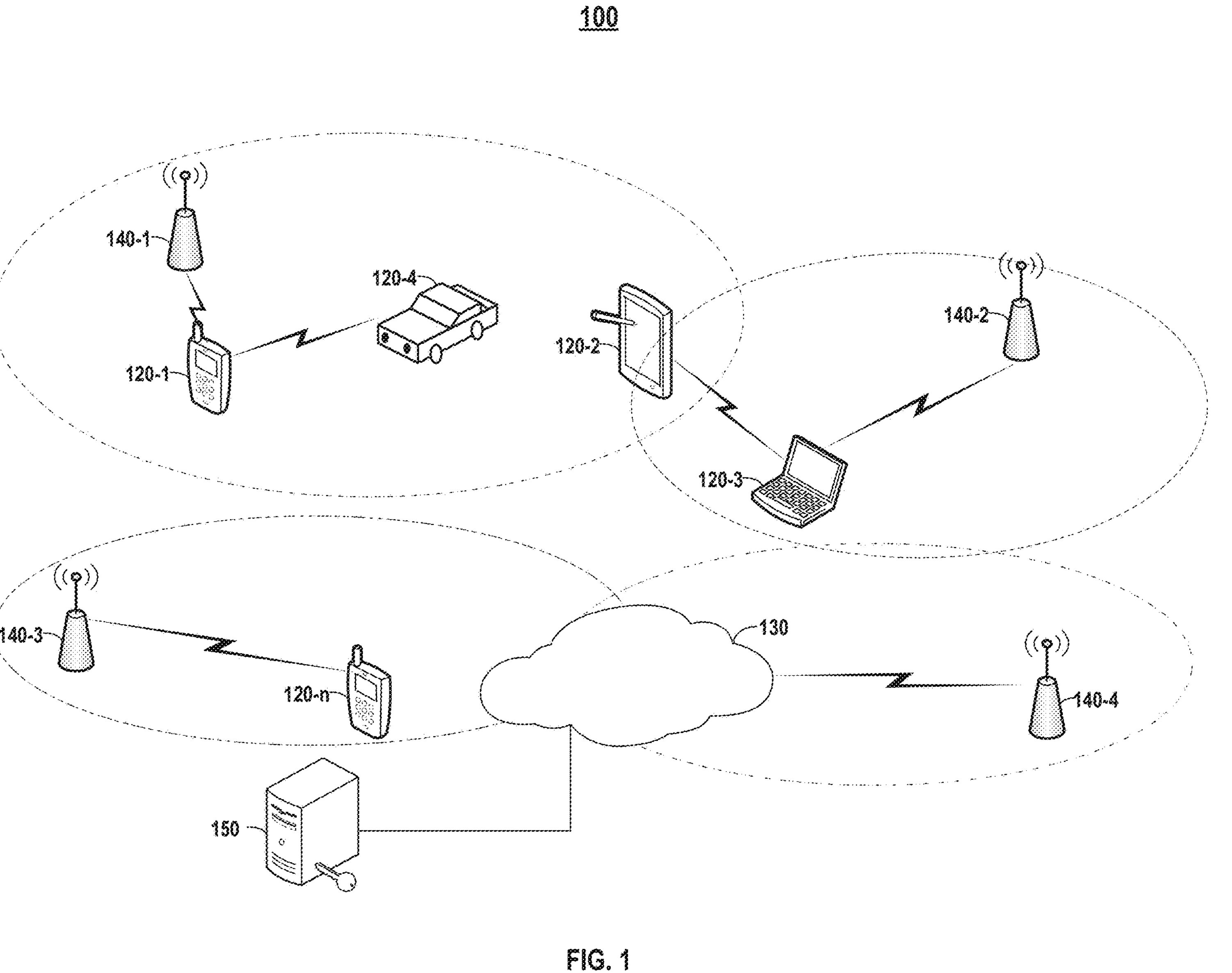
FIG. 1 illustrates an exemplary wireless network, according to some embodiments of the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, wireless local area network (WLAN) system, a global navigation satellites system (GNSS), and other networks. The terms "network" and "system" are often used interchangeably. A CDMA network may implement a radio access technology (RAT), such as Universal Terrestrial Radio Access (UTRA), evolved UTRA (E-UTRA), CDMA 2000, etc. A TDMA network may implement a RAT, such as the Global System for Mobile Communications (GSM). An OFDMA network may implement a RAT, such as LTE or NR. A WLAN system may implement a RAT, such as Wi-Fi. The techniques described herein may be used for the wireless networks and RATs mentioned above, as well as other wireless networks and RATs.

Existing WLAN systems enable various station (STA)-based power saving techniques. These power-saving techniques include, e.g., sleep modes. A sleep mode may be entered into when there are gaps in packet exchange between the STA and its corresponding access point (AP). While these sleep modes may reduce power consumption at the STA during periods of low or no packet exchange, there is an undesirable latency associated with transitioning from sleep mode to active mode. Thus, time-sensitive packets may be missed by the STA or cause a hold-up at the AP due to the lag associated with this transition.

To overcome these and other challenges, the present disclosure enables an exemplary low-power listening (LPL) mode. During the LPL mode, the STA may remain awake, but it only monitors a bandwidth (BW) of reduced size for packets transmitted using a limited modulation and coding scheme (MCS). In so doing, the STA may still achieve reduced power consumption while avoiding the undesirable latency associated with transitioning from the sleep mode to the active mode. Additional details of the exemplary LPL technique are provided below in connection with FIGS. 1-13.

Although some embodiments are described herein in connection with a WLAN or GNSS communication system, the same or similar techniques may be applied to a cellular communication system, as well. For example, a UE that receives a signal from a 5G NR base station via beamforming and/or millimeter-wave (mmW) signaling may experience multi-path issues as these beams may reflect off nearby objects, which can deteriorate the accuracy of positioning determination using these signals. Thus, the techniques described below may apply to estimating a set of beam parameters for use in positioning determination by a UE in a cellular communication system without departing from the scope of the present disclosure.

FIG. 1 shows a simplified architecture of a wireless communication system 100 in accordance with certain embodiments presented herein. System 100 may include non-access point (AP) stations (STAs) such as user equipments (UEs) 120-1 through **120-*n* (collectively referred to as UEs 120), and AP STAs such as APs 140-1 through 140-4 (collectively referred to as APs 140), which may communicate over a wireless communication network 130**.

Examples of UEs 120 may include, e.g., smartphones, vehicles, wearable devices, laptops, or any other device that can provide a navigation function to a user. In some embodiments, wireless communication network 130 may take the form of and/or may include one or more wireless local area networks (WLANs) or the internet. In some embodiments, UEs 120 and/or APs 140 may communicate with server 150 via wireless communication network 130. While system 100 illustrates some UEs 120 and APs 140, the number of UEs 120 and APs 140 in a wireless communication network (e.g., a WLAN) may be varied in accordance with various system parameters. In general, system 100 may include a smaller or larger number of UEs 120 and/or APs 140.

In some embodiments, one or more UEs 120 and/or APs 140 in system 100 may comprise multiple antennas and may support multiple-input multiple-output (MIMO) and/or multi-user MIMO (MU-MIMO). UE 120 may receive and measure signals from APs 140, which may be used for position determination. In some embodiments, APs 140 may form part of a wireless communication network 130, such as a WLAN. For example, a WLAN may be an IEEE 802.11x network (e.g., such as IEEE 802.11ax, 802.11ay, or a later version). Further, system 100 may comprise or take the form of an Extended Service Set (ESS) network, which may comprise a plurality of appropriately configured basic service set (BSS) networks, an Independent Basic Service Set (IBSS) network, an ad-hoc network, or a peer-to-peer (P2P) network (e.g., operating according to Wi-Fi Direct or similar protocols).

In some embodiments, one or more UEs 120 and APs 140 may communicate over wireless communication network 130, which may be based on IEEE 802.11 or compatible standards. In some embodiments, UEs 120 and APs 140 may communicate using variants of the IEEE 802.11 standards. For example, UEs 120 and APs 140 may communicate using 802.11ac on the 5 GHz bands, which may support multiple spatial streams including MIMO and MU-MIMO. In some embodiments, UEs 120 and APs 140 may communicate using some of the above standards, which may further support one or more of Very High Throughput (VHT) (as described in the above standards) and High-Efficiency WLAN (HEW), and/or beamforming with standardized sounding and feedback mechanisms. In some embodiments, UEs 120 and or APs 140 may additionally support legacy standards for communication with legacy devices.

In some embodiments, UEs 120 and/or APs 140 may be coupled to one or more additional networks, such as a cellular carrier network, a satellite positioning network (shown in FIG. 1), wireless personal area network (WPAN) access points, and the like (not shown in FIG. 1). In some embodiments, UEs 120 and/or APs 140 may be coupled to a wireless wide area network (WWAN) (not shown in FIG. 1), A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), 5G new radio (NR), WiMax, and so on.

A UE 120 and AP 140 in any of the above-described communication networks may be configured to perform operations associated with the exemplary LPL mode techniques are provided below in connection with FIGS. 3-13.

Figure 2:
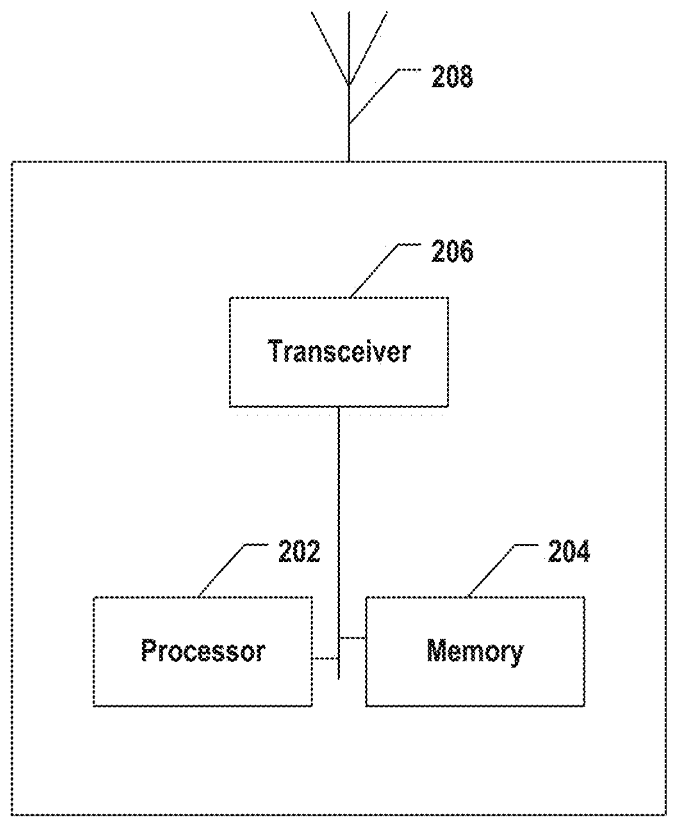
FIG. 2 illustrates a block diagram of an exemplary node, according to some embodiments of the present disclosure.

Each element in FIG. 1 may be considered a node of wireless communication system 100. More detail regarding the possible implementation of a node is provided by way of example in the description of a node 200 in FIG. 2. Node 200 may be configured as UE 120, AP 140, or server 150 in FIG. 1. As shown in FIG. 2, node 200 may include a processor 202, a memory 204, and a transceiver 206. These components are shown as connected to one another by a bus, but other connection types are also permitted. When node 200 is UE 120, additional components may also be included, such as a user interface (UI), sensors, and the like. Similarly, node 200 may be implemented as a blade in a server system when node 200 is configured as server 150. Other implementations are also possible.

Transceiver 206 may include any suitable device for sending and/or receiving data. Node 200 may include one or more transceivers, although only one transceiver 206 is shown for simplicity of illustration. An antenna 208 is shown as a possible communication mechanism for node 200. Multiple antennas and/or arrays of antennas may be utilized for receiving multiple spatially multiplex data streams. Additionally, examples of node 200 may communicate using wired techniques rather than (or in addition to) wireless techniques. For example, AP 140 may communicate wirelessly to UE 120 and may communicate by a wired connection (for example, by optical or coaxial cable) to server 150. Other communication hardware, such as a network interface card (NIC), may be included as well.

As shown in FIG. 2, node 200 may include processor 202. Although only one processor is shown, it is understood that multiple processors can be included. Processor 202 may include microprocessors, microcontroller units (MCUs), digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 202 may be a hardware device having one or more processing cores. Processor 202 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

As shown in FIG. 2, node 200 may also include memory 204. Although only one memory is shown, it is understood that multiple memories can be included. Memory 204 can broadly include both memory and storage. For example, memory 204 may include random-access memory (RAM), read-only memory (ROM), static RAM (SRAM), dynamic RAM (DRAM), ferro-electric RAM (FRAM), electrically erasable programmable ROM (EEPROM), compact disc read only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 202. Broadly, memory 204 may be embodied by any computer-readable medium, such as a non-transitory computer-readable medium.

Processor 202, memory 204, and transceiver 206 may be implemented in various forms in node 200 for performing wireless communication functions. In some embodiments, processor 202, memory 204, and transceiver 206 of node 200 are implemented (e.g., integrated) on one or more system-on-chips (SoCs). In one example, processor 202 and memory 204 may be integrated on an application processor (AP) SoC (sometimes known as a "host," referred to herein as a "host chip") that handles application processing in an operating system (OS) environment, including generating raw data to be transmitted. In another example, processor 202 and memory 204 may be integrated on a baseband processor (BP) SoC (sometimes known as a "modem," referred to herein as a "radio") that converts the raw data, e.g., from the host chip, to signals that can be used to modulate the carrier frequency for transmission, and vice versa, which can run a real-time operating system (RTOS). In still another example, processor 202 and transceiver 206 (and memory 204 in some cases) may be integrated on an RF SoC (sometimes known as a "transceiver," referred to herein as a "wireless network interface") that transmits and receives RF signals with antenna 208. It is understood that in some examples, some or all of the host chip, radio, and wireless network interface may be integrated as a single SoC. For example, a radio and a wireless network interface may be integrated into a single SoC that manages all the radio functions for GNSS communication, WLAN communication, WPAN communication, and/or cellular communication.

Figure 3:
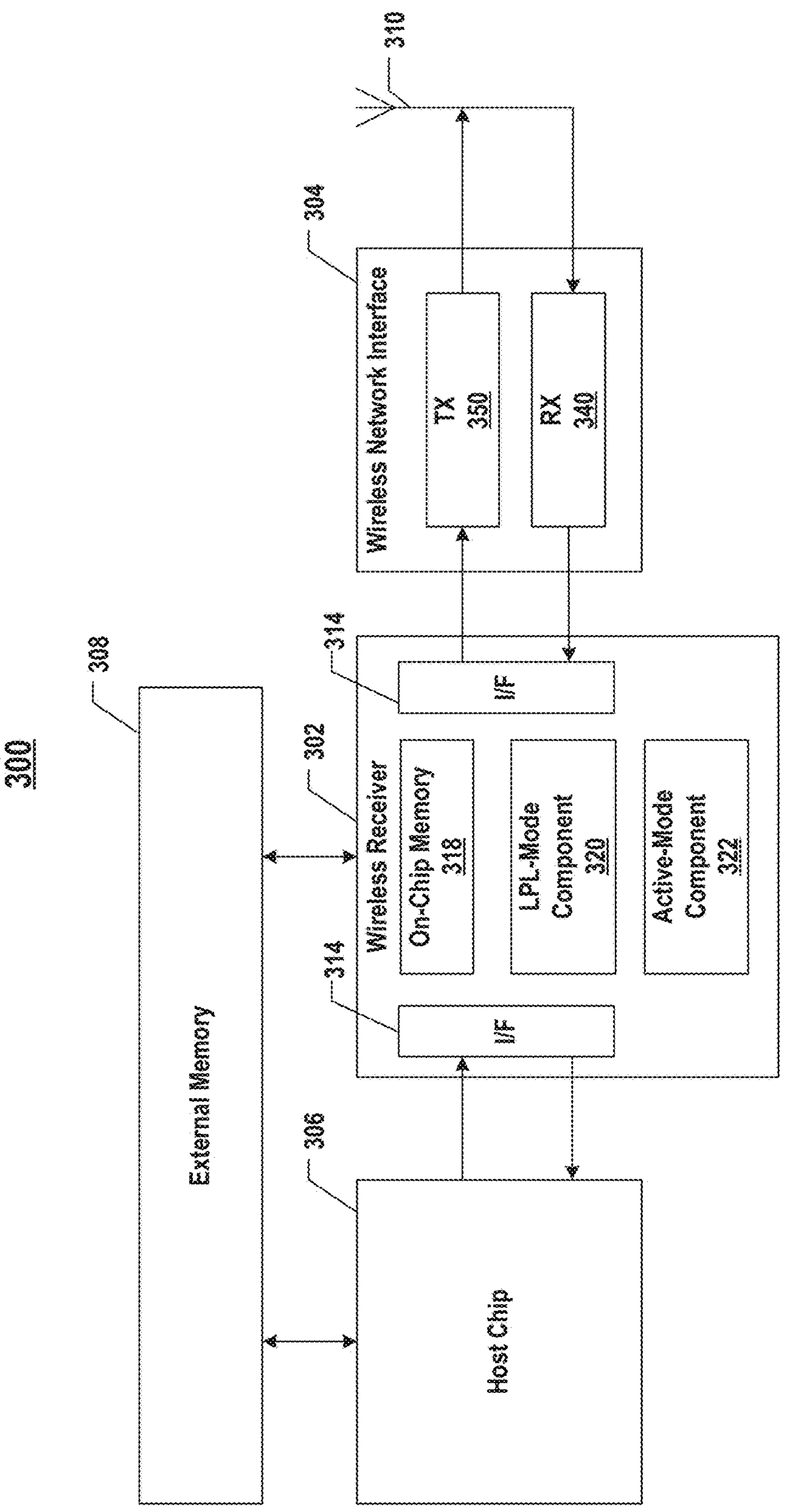
FIG. 3 illustrates a block diagram of an apparatus including a wireless receiver, a wireless network interface, and a host chip, according to some embodiments of the present disclosure.

FIG. 3 illustrates a block diagram of an apparatus 300 including a wireless receiver 302, a wireless network interface 304, and a host chip 306, according to some embodiments of the present disclosure. Apparatus 300 may be implemented as UE 120 of wireless communication system 100 in FIG. 1. In some embodiments, wireless receiver 302 is implemented by processor 202 and memory 204, and wireless network interface 304 is implemented by processor 202, memory 204, and transceiver 206, as described above with respect to FIG. 2.

Besides the on-chip memory 318 (also known as "internal memory," e.g., registers, buffers, or caches) on wireless receiver 302, wireless network interface 304, or host chip 306, apparatus 300 may further include an external memory 308 (e.g., the system memory or main memory) that can be shared by wireless receiver 302, wireless network interface 304, or host chip 306 through the system/main bus. Although wireless receiver 302 is illustrated as a standalone SoC in FIG. 3, it is understood that in one example, wireless receiver 302 and wireless network interface 304 may be integrated as one SoC; in another example, wireless receiver 302 and host chip 306 may be integrated as one SoC; in still another example, wireless receiver 302, wireless network interface 304, and host chip 306 may be integrated as one SoC, as described above.

In the uplink when apparatus 300 is a non-AP STA and in the downlink when apparatus is an AP, host chip 306 may generate raw data and send it to wireless receiver 302 for encoding, modulation, and mapping. Interface 314 of wireless receiver 302 may receive the data from host chip 306. Wireless receiver 302 may also access the raw data generated by host chip 306 and stored in external memory 308, for example, using the direct memory access (DMA). Wireless receiver 302 may first encode (e.g., by source coding and/or channel coding) the raw data and modulate the coded data using any suitable modulation techniques, such as multi-phase shift keying (MPSK) modulation or quadrature amplitude modulation (QAM). Wireless receiver 302 may perform any other functions, such as symbol or layer mapping, to convert the raw data into a signal that can be used to modulate the carrier frequency for transmission. In the uplink, wireless receiver 302 may send the modulated signal to wireless network interface 304 via interface 314. Wireless network interface 304, through a transmitter (TX) 350, may convert the modulated signal in the digital form into analog signals, i.e., RF signals, and perform any suitable front-end RF functions, such as filtering, digital pre-distortion, up-conversion, or sample-rate conversion. Antenna array 310 may transmit the RF signals provided by TX 350 of wireless network interface 304.

In the downlink when apparatus 300 is a non-AP STA and in the uplink when apparatus 300 is an AP, antenna array 310 may receive signals from one or more signals from an AP, for example. The signals may be passed to a receiver (RX) 340 of wireless network interface 304. Wireless network interface 304 may perform any suitable front-end RF functions, such as filtering, IQ imbalance compensation, down-paging conversion, or sample-rate conversion, and convert the RF signals (e.g., transmission) into low-frequency digital signals (baseband signals) that can be processed by wireless receiver 302.

Figure 4A:
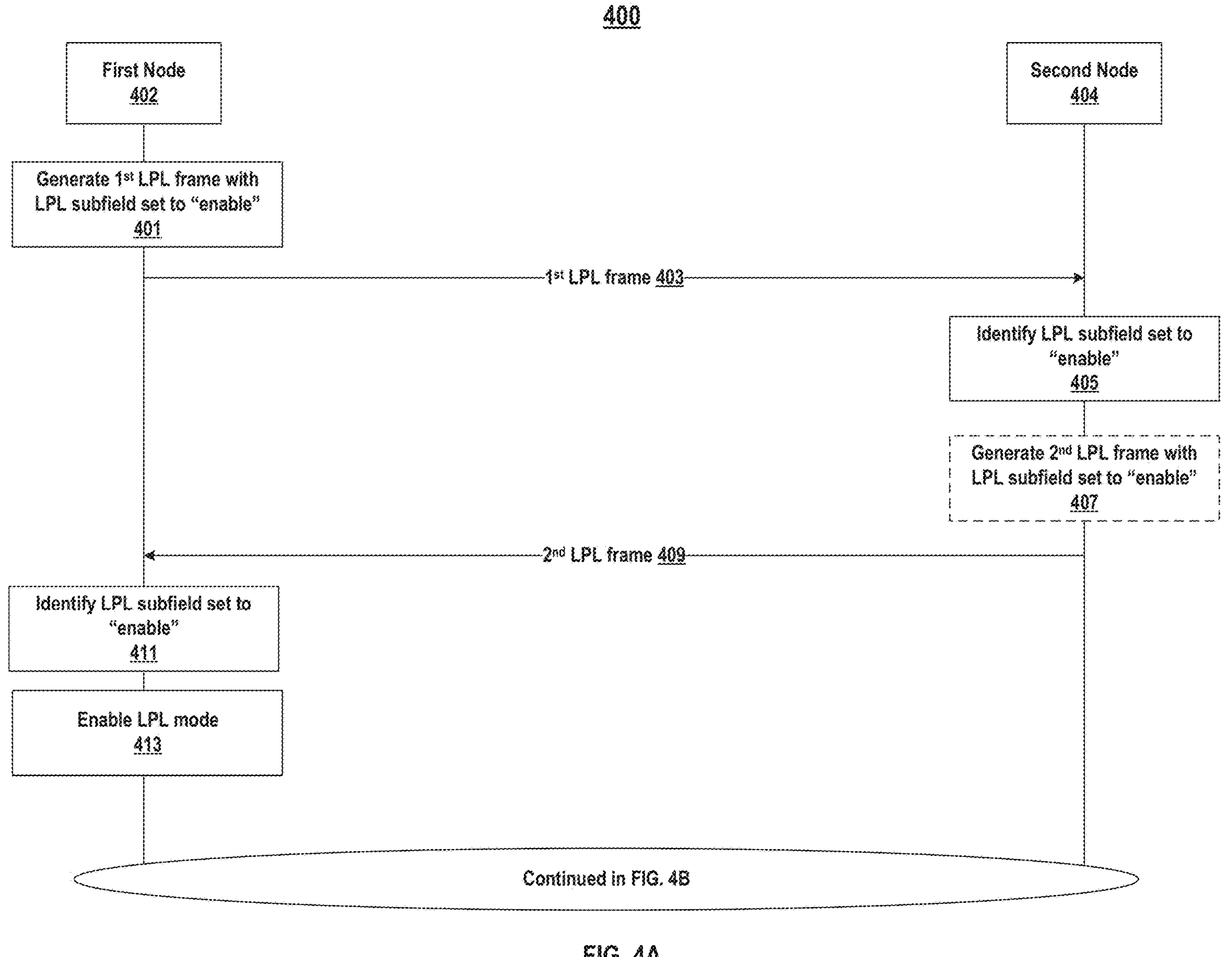
FIGS. 4A-4C illustrate a call flow of first exemplary LPL operations of a first node and a second node, according to some embodiments of the present disclosure.
Figure 4B:
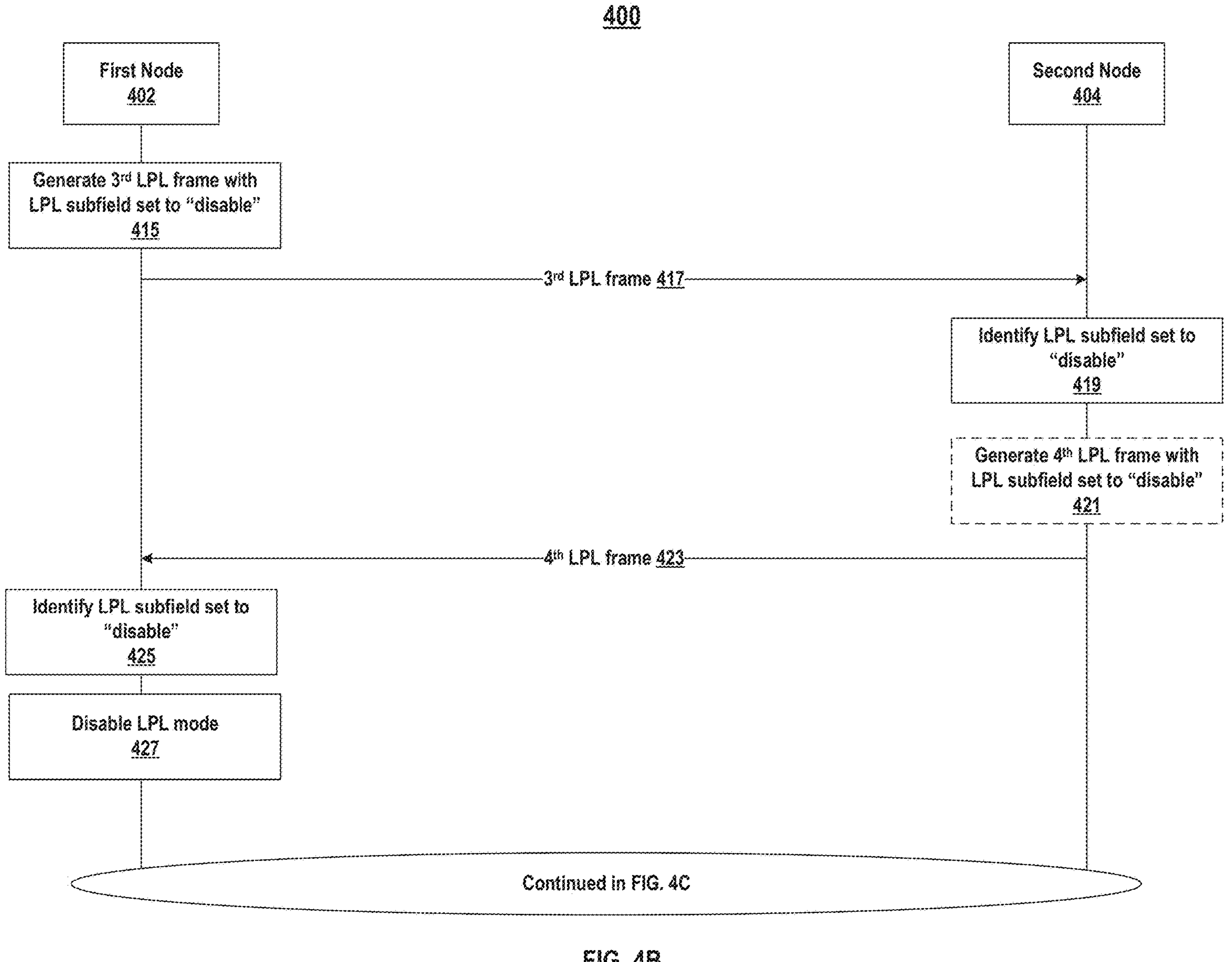
Figure 4C:
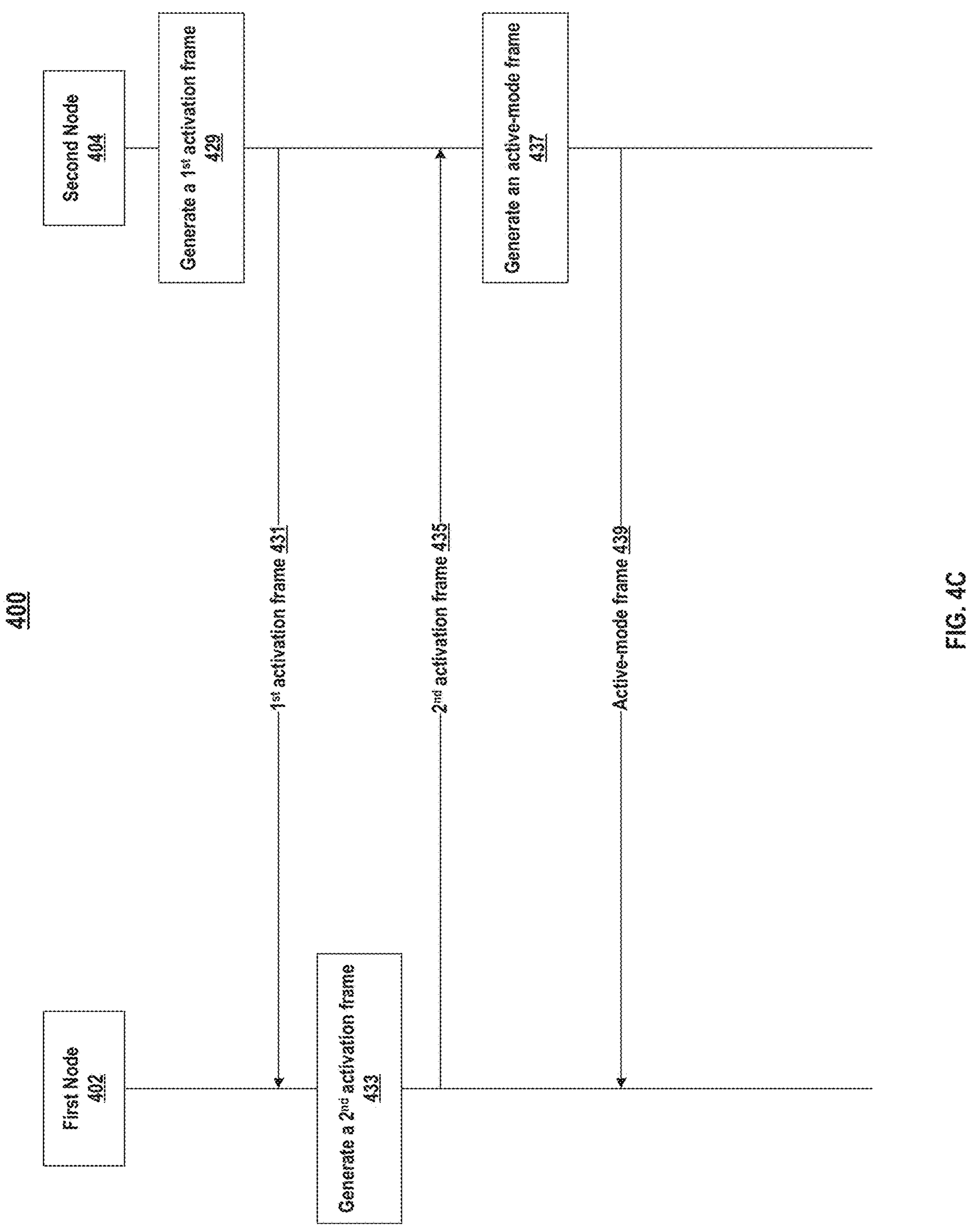

As seen in FIG. 3, wireless receiver 302 may include, e.g., an LPL-mode component 320 and active-mode component 322. While LPL-mode, LPL-mode component 320 may be activated and active-mode component 322 may enter a sleep mode to conserve power. While in active mode, active-mode component 322 may be active, and LPL-mode component 320 may be in a sleep mode to conserve power. Additional details associated with LPL-mode and its exemplary operations are described below in connection with FIGS. 4A-4D. When apparatus 300 is implemented as a non-AP STA, wireless receiver 302 may perform operations 401, 403, 411, 413, 415, 417, 425, 427, 433, 435, 451, 453, 455, and 465 in FIGS. 4A-4D. On the other hand, when apparatus 300 is implemented as an AP, wireless receiver 302 may perform operations 405, 407, 409, 419, 421, 423, 429, 431, 437, 439, 457, 459, 461, 463, and 465 in FIGS. 4A-4D. In FIGS. 4A-4C, optional operations may be indicated with dashed lines.

Figure 4D:
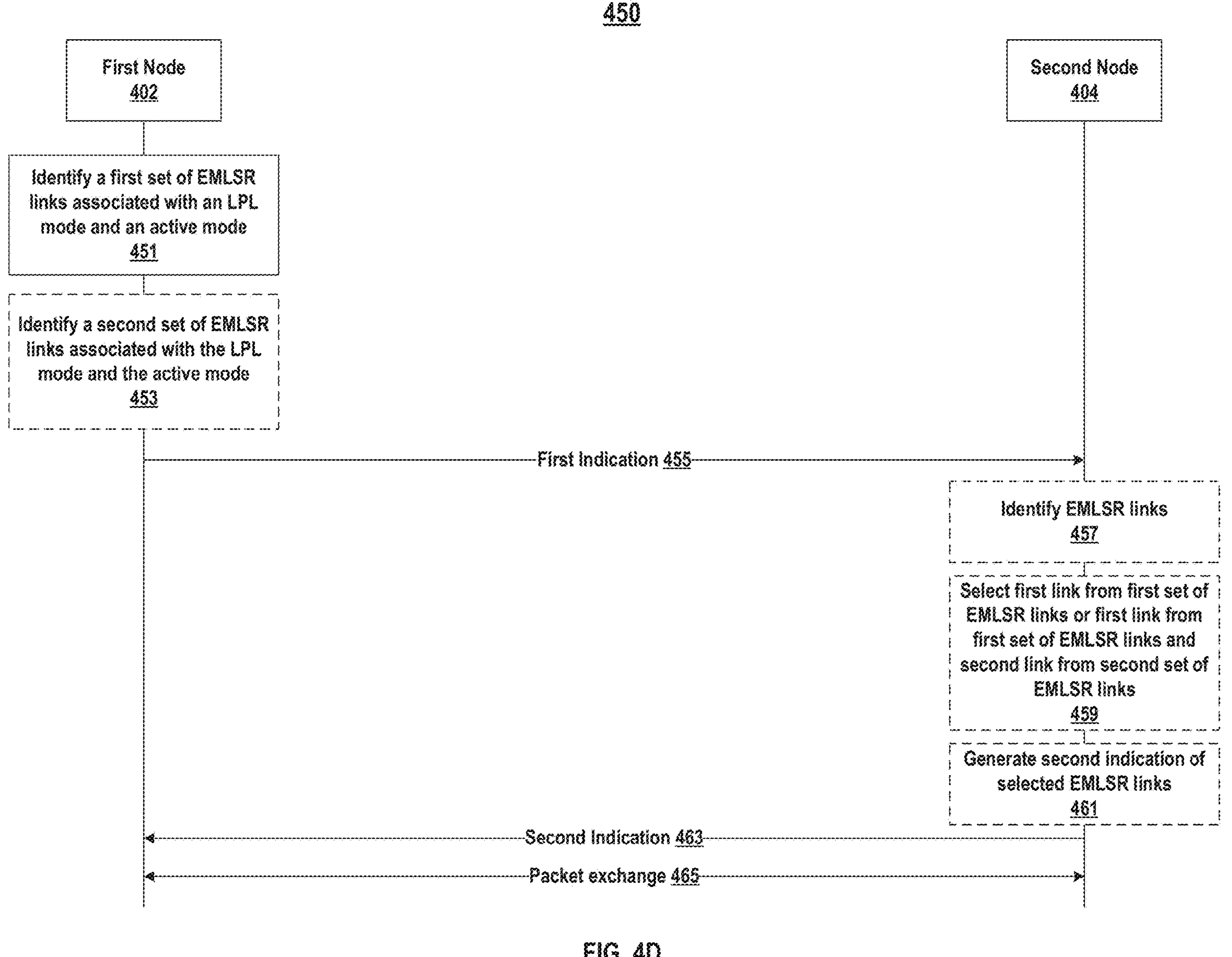
FIG. 4D illustrates a call flow of second exemplary LPL operations of a first node and a second node, according to some embodiments of the present disclosure.
Figure 5:
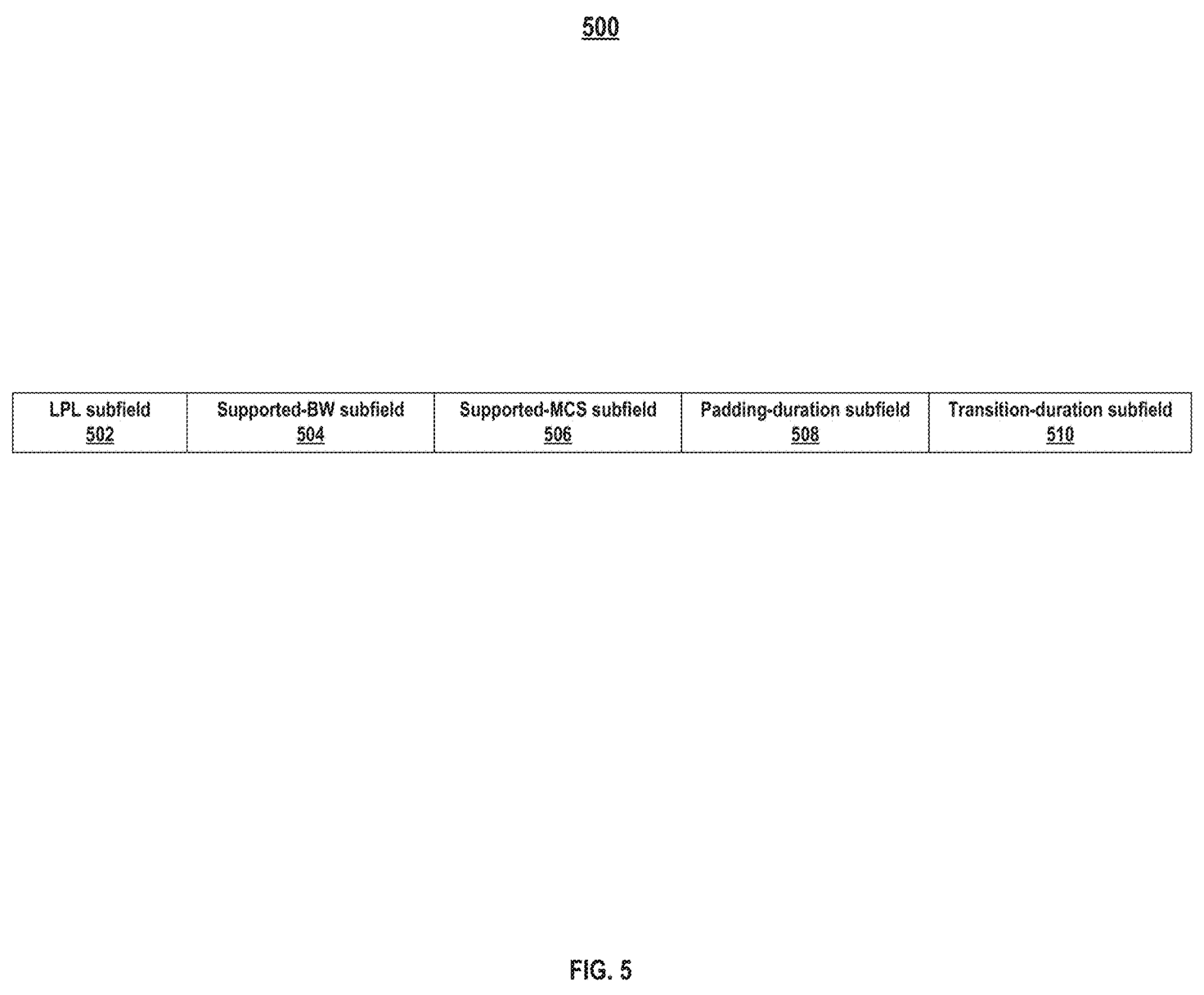
Figure 6:
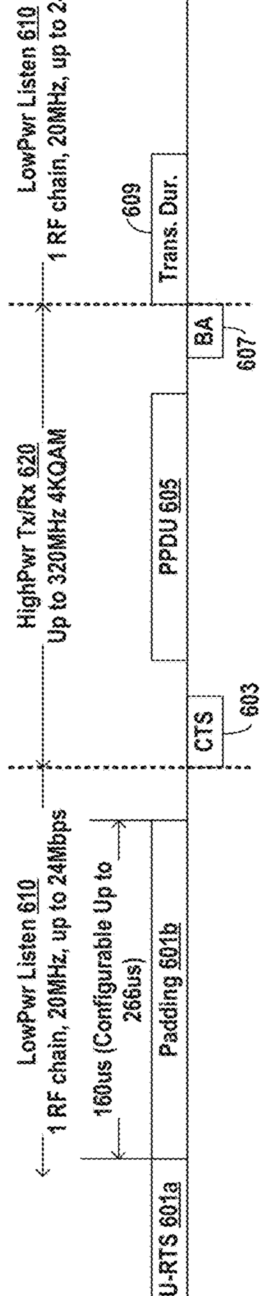
FIG. 6 illustrates an exemplary timing diagram of an LPL-mode cycle and an active-mode cycle, according to some embodiments of the present disclosure.
Figure 7:
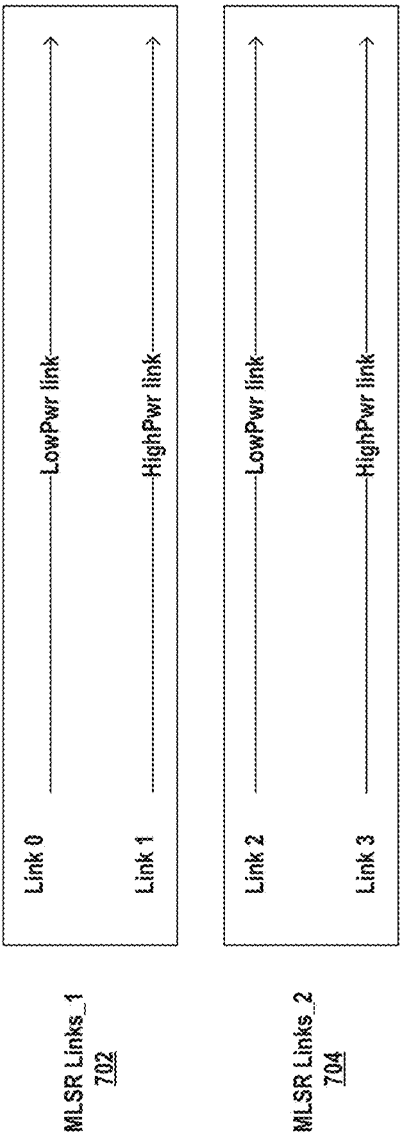
FIG. 7 illustrates a diagram of exemplary sets of enhanced-multi-link single radio (EMLSR) links, according to some embodiments of the present disclosure.
Figure 9:
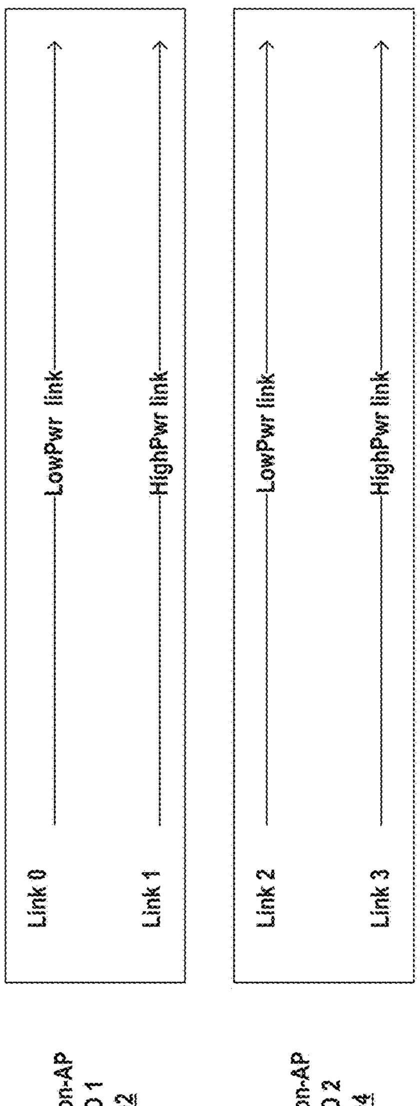
FIG. 9 illustrates a diagram of an exemplary set of sub-multi-link device (MLD) links, according to some embodiments of the present disclosure.

FIGS. 4A-4C illustrate a call flow of first exemplary LPL operations 400 of a first node 402 (e.g., a non-AP STA) and a second node 404 (e.g., an AP), according to some embodiments of the present disclosure. FIG. 4D illustrates a call flow of second exemplary LPL operations 450 of first node 402 and second node 404, according to some embodiments of the present disclosure. FIG. 5 illustrates an exemplary LPL frame 500 including a plurality of subfields, according to some embodiments of the present disclosure. FIG. 6 illustrates an exemplary timing diagram 600 of an LPL-mode cycle and an active-mode cycle, according to some embodiments of the present disclosure. FIG. 7 illustrates a diagram 700 of exemplary sets of EMLSR links, according to some embodiments of the present disclosure. FIG. 8 illustrates a diagram of an exemplary EMLSR bitmap subfield 800 in an EML frame, according to some embodiments of the present disclosure. FIG. 9 illustrates a diagram 900 of an exemplary set of sub-MLD links, according to some embodiments of the present disclosure. FIGS. 4A-4C, 5, and 6 will be described together, and FIGS. 4D and 7-9 will be described together.

Referring to FIGS. 4A, 5, and 6, first node 402 (e.g., a non-AP STA) may generate (at 401) an first LPL frame with an LPL subfield 502 set to "enable." For example, first node 402 may include a first bit value (e.g., 1) in LPL subfield 502 to enable LPL mode. Moreover, first node 402 may generate (at 401) the first LPL frame by setting a bit value in the supported-BW subfield 504 to indicate the maximum BW that first node 402 supports during LPL-mode. For example, first node 402 may set a first bit value (e.g., 00) to indicate a first maximum BW (e.g., 20 MHz), a second bit value (e.g., 01) to indicate a second maximum BW (e.g., 80 MHz), and so on. Still further, first node 402 may set a first bit value to indicate a maximum MCS (or data rate) it supports during LPL mode in the supported-MCS subfield 506. The candidate MCSs may include, e.g., binary phase-shift keying (BPSK) or quadrature phase-shift keying (QPSK). The candidate data rates may include, e.g., 6 Mbps, 12 Mbps, 24 Mbps, etc. The padding-duration subfield 508 may be used to indicate the minimum padding-duration needed in an activation frame by second node. Referring to FIG. 6, the activation frame is a multi-user (MU) request-to-send (RTS) (MU-RTS) frame 601*a*, which includes requested padding-duration 601*b*. In the non-limiting example depicted in FIG. 6, the padding duration is 150 μs. Padding duration 601*b* may be less than or more than 150 μs (e.g., 16 μs, 32 μs, 64 μs, 128 μs, 150 μs, 256 μs, etc.) without departing from the scope of the present disclosure. Padding-duration 601*b* may be calculated starting from the end of the last orthogonal frequency-division multiplexed (OFDM) symbol that carries user-specific information to the end of a physical layer protocol data unit (PPDU) 605 send during active period 620. The transition-duration subfield 510 may be set to indicate the minimum transition duration 609 first node 402 needs to transition from active mode to LPL-mode. Padding-duration 601*b* may be selected to enable first node 402 to transition from LPL mode to active mode.

Referring again to FIG. 4A, once generated, first node 402 may transmit (at 403) the first LPL frame to second node 404. Second node 404 may identify (at 405) that LPL subfield 502 is set to "enable," and generate (at 407) a second LPL frame with its LPL subfield set to "enable." Then, second node 404 may transmit (at 409) the second LPL frame to first node 402. First node 402 may identify (at 411) the LPL subfield in the second LPL frame is set to "enable." First node 402 may enable (at 413) LPL mode. In some embodiments, first node 402 may enable (at 413) LPL mode in response to transmitting (at 403) the first LPL frame. In some other embodiments, first node 402 may enable (at 413) LPL mode in response to identifying (at 411) the LPL subfield in the second LPL frame is set to "enable."

Referring to FIG. 4B, to tear down the LPL mode, first node 402 may generate (at 415) a third LPL frame with the LPL subfield 502 set to "disable." The other subfields in the third LPL frame may remain the same as those in the first LPL frame. Then, first node 402 may transmit (at 417) the third LPL frame to second node 404. Second node 404 may identify (at 419) the LPL subfield in the third LPL frame is set to "disable," and generate (at 421) a fourth LPL frame with its LPL subfield set to "disable." Second node 404 may transmit (at 423) the fourth LPL frame to first node 402. First node 402 may identify (at 425) the LPL subfield in the fourth LPL frame is set to "disable." First node 402 may disable (at 427) the LPL mode. In some embodiments, first node 402 may disable (at 427) the LPL mode in response to transmitting (at 417) the third LPL frame. In some other embodiments, first node 402 may disable (at 427) the LPL mode in response to identifying (at 425) the LPL subfield in the fourth LPL frame is set to "disable."

Referring to FIG. 4C, to cause first node 402 to transition to active mode without tearing down the LPL mode, second node 404 may generate (at 429) an activation frame. The activation frame may be generated based on the information included in padding-duration subfield 508 in the first LPL frame. Referring to FIG. 6, as mentioned above, the activation frame may include a MU-RTS frame 601*a* with padding-duration 601*b*. Second node 404 may transmit (at 431) the activation frame to first node 402. First node 402 may generate (at 433) a second activation frame, which is transmitted (at 435) to second node 404. The second activation frame may include a clear-to-send (CTS) frame 603, as shown in FIG. 6.

Referring to FIG. 6, after transmitting CTS 603, first node 402 enters an active-mode (e.g., a high-power mode) to perform frame exchange with a higher order MCS, larger data throughput, and/or larger BW. During the active period 620, second node 404 may generate (at 437) an active-mode frame, such as a physical layer protocol data unit (PPDU) 605 in FIG. 6. Second node 404 may transmit (at 439) the active-mode frame to first node 402 with a larger MCS, larger throughput, and/or larger bandwidth than communications send during an LPL period 610. Still referring to FIG. 6, first node 402 may send a block acknowledgement (BA) 607 to indicate the receipt of the active-mode frame. Then, first node 402 may transition back to LPL-mode during minimum transition duration 609 of the next LPL period 610.

In some embodiments, active-mode frame exchange may conclude if, e.g., 1) the transmission opportunity by second node 404 ends or 2) if first node 402 does not receive a packet after CTS frame 603 is sent. Other operations that can be performed during active period 620 include, e.g., 1) a sounding procedure (both trigger based and non-trigger based sounding), 2) uplink transmissions by first node 402, etc.

Referring to FIGS. 4D, 7, and 8, the present disclosure provides exemplary EMLSR operations, which enable first node 402 (e.g., a non-AP multi-link device (MLD)) with multiple receive chains to monitor one or more EMLSR links when second node 404 (e.g., the corresponding non-AP STA(s)) affiliated with the non-AP MLD is in an awake state. The one or more EMLSR links may be indicated by first node 402. Once received, second node 404 may transmit an initial control frame sent in a, e.g., PPDU (e.g., a non-high-throughput (HT)) PPDU, which indicates which of the EMLSR link(s) will be used for frame exchanges based on the link initial control frame was received.

For example, first node 402 may identify (at 451) a first set of EMLSR links (one or more EMLSR links). Although not shown, in some embodiments, first set of EMLSR links 702 may include only a single link. As shown in FIG. 7, first set of EMLSR links 702 may include a first low-power link (Link 0) and a first high-power link (Link 1) in some embodiments. As used herein, "a set of EMLSR links" may include, e.g., a null set, a single EMLSR link, two EMLSR links, three EMLSR links, etc.

Still referring to FIGS. 4D, 7, and 8, first node 402 may identify (at 453) a second set of EMLSR links (one or more EMLSR links. Although not shown, in some embodiments, first set of EMLSR links 702 may include only a single link. As shown in FIG. 7, second set of EMLSR links 704 may include a second low-power link (Link 2) and a second high-power link (Link 2).

Referring to FIGS. 4D, 7, and 8, first node 402 may transmit (at 455) a first indication of the first set of EMLSR links 702 or the first and second sets of EMLSR links 702, 704. Referring to FIG. 8, the present disclosure enables an indication of the first set of EMLSR links 702 or the first set of EMLSR links 702 and the second set of EMLSR links 704 in EMLSR link bitmap subfield 800. For example, the EML control field (not shown) can be changed to include a "Number of EMLSR links" subfield 802, which may indicate multiple EMLSR links are setup for the non-AP MLD (e.g., first node 402). Each set of EMLSR links includes one or multiple links, which are indicated by the subfields, e.g., EMLSR link bitmap for links_1 804*a*, EMLSR link bitmap for links_2 804*b*, . . . , EMLSR link bitmap for links_n 804*n*. Here, n stands for the total number of sets of EMLSR links indicated in the number of EMLSR links subfield 802. In this embodiment, first node 402 may generate a frame with an EMLSR link bitmap subfield 800 (first indication) that indicates first set of EMLSR links 702 and second set of EMLSR links 704.

Still referring to FIG. 8, first node 402 may indicate the EMLSR link(s) EMLSR link bitmap subfield 800 of the EML Control field of the EML operating mode notification frame by setting the bit position(s), which corresponds to the link identification (ID) value(s) of the EMLSR link(s) in the EMLSR link bitmap subfield 800 to 1. In some embodiments, first node 402 may only set one bit to 1 in the bit positions of the EMLSR link bitmap subfield 800 when it enables the EMLSR mode. This is when the set of EMLSR links only includes a single EMLSR link. For the EMLSR mode enabled in a single radio non-AP MLD (e.g., one embodiment of first node 402), the STA(s) affiliated with the non-AP MLD that operates on the enabled link(s) that corresponds to the bit position(s) of the EMLSR link bitmap subfield 800 equal to 0 may operate in an LPL mode or a sleep mode if a non-AP STA affiliated with the non-AP MLD that operates on one of the EMLSR link(s) is in an awake state.

Second node 404 may identify (at 457) the one or more EMLSR links in each set based on the information in EMLSR link bitmap subfield 800. Second node 404 may select (at 459) a first EMLSR link from first set of EMLSR links 702 or a first EMLSR link from first set of EMLSR links 702 and a second EMLSR link from second set of EMLSR links 704. A second indication of the selected EMLSR link(s) may be generated (at 461) by second node 404.

Second node 404 may transmit (at 463) a second indication of the selected EMLSR link(s). First node 402 and second node 404 may perform (at 465) packet exchange using the EMLSR link(s) during LPL mode and active mode. The packet exchange may include monitoring the selected EMLSR link(s). When two links are indicated, concurrent Tx/Rx operations may be performed during LPL mode and/or active mode.

Referring to FIG. 9, another alternative to solve the above-mentioned issue of EMLSR is to allow first node 402 (e.g., a MLD) to set up multiple sub-MLDs. Each sub-MLD will reuse the existing EMLSR definition and operating procedures. In the example illustrated in FIG. 9, first node 402 may set up two sub non-AP MLDs; in other words, it may think of itself as two non-AP MLDs. For example, sub non-AP MLD 1 is associated with link 0 and link 1, which form a first set of EMLSR links 902 for sub non-AP MLD 1. Sub non-AP MLD 2 is associated with link 2 and link 3, which form a second set of EMLSR links 904 for sub non-AP MLD 2. In this embodiment, first node 402 may associate (at 455) a first sub-MLD with first set of EMLSR links 902 and a second sub-MLD with second set of EMLSR links 904.

Figure 10A:
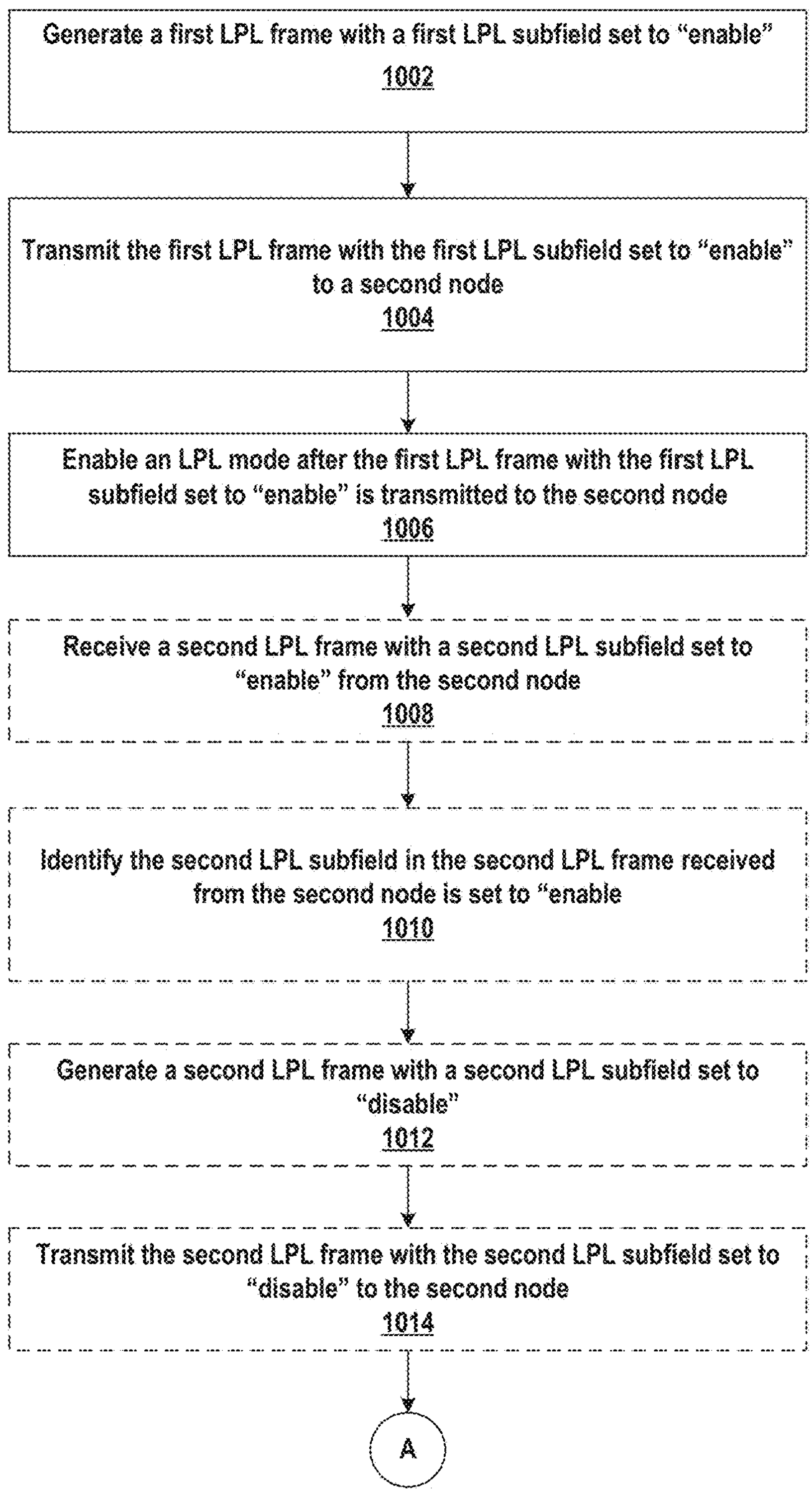
FIGS. 10A and 10B illustrate a flowchart of a first exemplary method for wireless communication, according to some embodiments of the present disclosure.
Figure 10B:
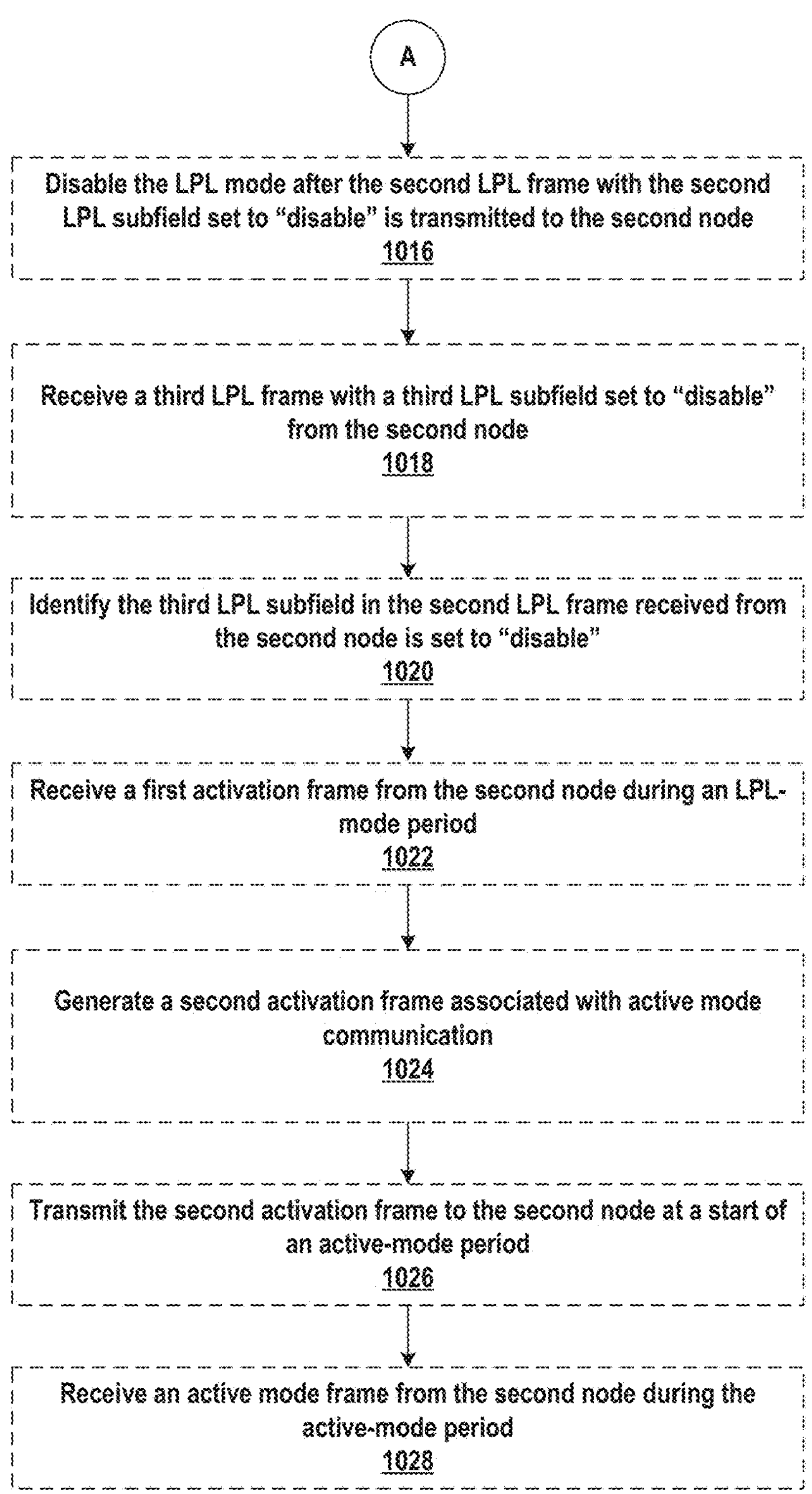

FIGS. 10A and 10B illustrate a flowchart of a first exemplary method 1000 of wireless communication, according to embodiments of the disclosure. First method 1000 may be performed by a wireless device, e.g., such as UE 120, node 200, apparatus 300, wireless receiver 302, LPL-mode component 320, active-mode component 322, first node 402, or a non-AP STA, just to name a few. First method 1000 may include steps 1002-1028 as described below. It is to be appreciated that some of the steps may be optional, and some of the steps may be performed simultaneously, or in a different order than shown in FIGS. 10A and 10B.

Referring to FIG. 10A, at 1002, the wireless device may generate a first LPL frame with a first LPL subfield set to "enable." For example, referring to FIG. 4A, first node 402 (e.g., a non-AP STA) may generate (at 401) a first LPL frame with an LPL subfield 502 set to "enable." For example, first node 402 may include a first bit value (e.g., 1) in LPL subfield 502 to enable LPL mode. Moreover, first node 402 may generate (at 401) the first LPL frame by setting a bit value in the supported-BW subfield 504 to indicate the maximum BW first node 402 supports during LPL-mode. For example, first node 402 may set a first bit value (e.g., 00) to indicate a first maximum BW (e.g., 20 MHz), a second bit value (e.g., 01) to indicate a second maximum BW (e.g., 80 MHz), and so on. Still further, first node 402 may set a first bit value to indicate a maximum MCS (or data rate) it supports during LPL mode in the supported-MCS subfield 506. The candidate MCSs may include, e.g., binary phase-shift keying (BPSK) or quadrature phase-shift keying (QPSK). The candidate data rates may include, e.g., 6 Mbps, 12 Mbps, 24 Mbps, etc. The padding-duration subfield 508 may be used to indicate the minimum padding-duration needed in an activation frame by second node. Referring to FIG. 6, the activation frame is a multi-user (MU) request-to-send (RTS) (MU-RTS) frame 601*a*, which includes requested padding-duration 601*b*. In the non-limiting example depicted in FIG. 6, the padding duration is 150 μs. Padding duration 601*b* may be less than or more than 150 μs (e.g., 16 μs, 32 μs, 64 μs, 128 μs, 150 μs, 256 μs, etc.) without departing from the scope of the present disclosure. Padding-duration 601*b* may be calculated starting from the end of the last orthogonal frequency-division multiplexed (OFDM) symbol that carries user-specific information to the end of a physical layer protocol data unit (PPDU) 605 sent during active period 620. The transition-duration subfield 510 may be set to indicate the minimum transition duration 609 first node 402 needs to transition from active mode to LPL-mode.

At 1004, the wireless device may transmit the first LPL frame with the first LPL subfield set to "enable" to a second node. For example, referring to FIG. 4A, once generated, first node 402 may transmit (at 403) the first LPL frame to second node 404.

At 1006, the wireless device may enable an LPL mode after the first LPL frame with the first LPL subfield set to "enable" is transmitted to the second node. For example, referring to FIG. 4A, first node 402 may enable (at 413) LPL mode. In some embodiments, first node 402 may enable (at 413) LPL mode in response to transmitting (at 403) the first LPL frame. In some other embodiments, first node 402 may enable (at 413) LPL mode in response to identifying (at 411) the LPL subfield in the second LPL frame is set to "enable."

At 1008, the wireless device may receive a second LPL frame with a second LPL subfield set to "enable" from the second node. For example, referring to FIG. 4A, second node 404 may transmit (at 409) the second LPL frame, which is received by first node 402.

At 1010, the wireless device may identify the second LPL subfield in the second LPL frame received from the second node is set to "enable. For example, referring to FIG. 4A, first node 402 may identify (at 411) the LPL subfield in the second LPL frame is set to "enable."

At 1012, the wireless device may generate a second LPL frame with a second LPL subfield set to "disable." For example, referring to FIG. 4B, to tear down the LPL mode, first node 402 may generate (at 415) a third LPL frame with the LPL subfield 502 set to "disable." The other subfields in the third LPL frame may remain the same as those in the first LPL frame.

At 1014, the wireless device may transmit the second LPL frame with the second LPL subfield set to "disable" to the second node. For example, referring to FIG. 4B, first node 402 may transmit (at 417) the third LPL frame to second node 404.

Referring to FIG. 10B, at 1016, the wireless device may disable the LPL mode after the second LPL frame with the second LPL subfield set to "disable" is transmitted to the second node. For example, referring to FIG. 4B, first node 402 may disable (at 427) the LPL mode. In some embodiments, first node 402 may disable (at 427) the LPL mode in response to transmitting (at 417) the third LPL frame. In some other embodiments, first node 402 may disable (at 427) the LPL mode in response to identifying (at 425) the LPL subfield in the fourth LPL frame is set to "disable."

At 1018, the wireless device may receive a third LPL frame with a third LPL subfield set to "disable" from the second node. For example, referring to FIG. 4B, second node 404 may transmit (at 423) the fourth LPL frame, which is received first node 402.

At 1020, the wireless device may identify the third LPL subfield in the second LPL frame received from the second node is set to "disable." For example, referring to FIG. 4C, first node 402 may identify (at 425) the LPL subfield in the fourth LPL frame is set to "disable."

At 1022, the wireless device may receive a first activation frame from the second node during an LPL-mode period. For example, referring to FIG. 4C, second node 404 may transmit (at 431) the activation frame, which is received by first node 402.

At 1024, the wireless device may generate a second activation frame associated with active mode communication. For example, referring to FIG. 4C, first node 402 may generate (at 433) a second activation frame.

At 1026, the wireless device may transmit the second activation frame to the second node at a start of an active-mode period. For example, referring to FIG. 4C, first node 402 may transmit (at 435) the second activation frame to second node 404. The second activation frame may include a CTS frame 603, as shown in FIG. 6.

At 1028, the wireless device may receive an active-mode frame from the second node during the active-mode period. For example, referring to FIG. 4C, second node 404 may transmit (at 439) the active-mode frame to first node 402 with a larger MCS, larger throughput, and/or larger bandwidth than communications send during an LPL period 610. First node 402 may receive the active-mode frame.

Figure 11:
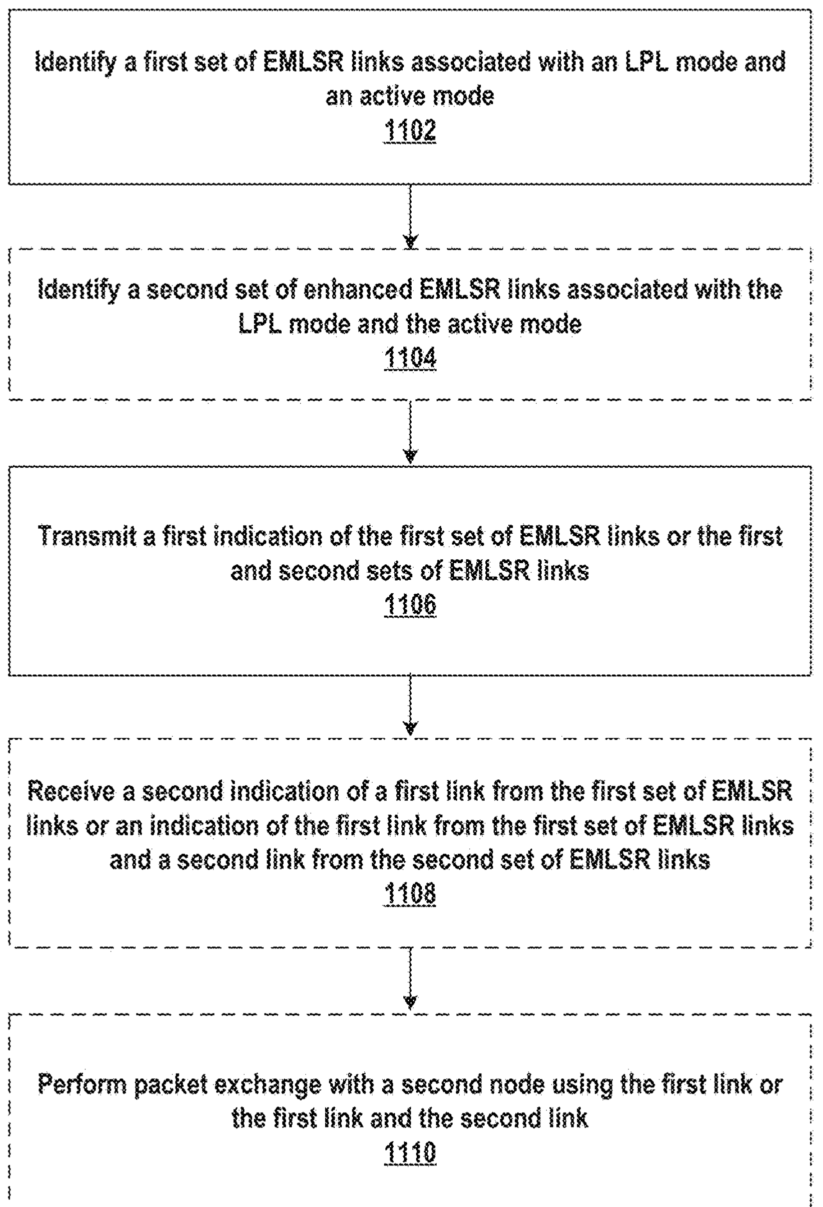
FIG. 11 illustrates a flowchart of a second exemplary method for wireless communication, according to some embodiments of the present disclosure.

FIG. 11 illustrates a flowchart of a second exemplary method 1100 of wireless communication, according to embodiments of the disclosure. Second method 1100 may be performed by a wireless device, e.g., such as UE 120, node 200, apparatus 300, wireless receiver 302, LPL-mode component 320, active-mode component 322, first node 402, or a non-AP STA, just to name a few. Second method 1100 may include steps 1102-1110 as described below. It is to be appreciated that some of the steps may be optional, and some of the steps may be performed simultaneously, or in a different order than shown in FIG. 11.

Referring to FIG. 11, at 1102, the wireless device may identify a first set of EMLSR links associated with an LPL mode and an active mode. For example, referring to FIG. 4D, first node 402 may identify (at 451) a first set of EMLSR links (one or more EMLSR links). Although not shown, in some embodiments, first set of EMLSR links 702 may include only a single link. As shown in FIG. 7, first set of EMLSR links 702 may include a first low-power link (Link 0) and a first high-power link (Link 1) in some embodiments.

At 1104, the wireless device may identify a second set of enhanced EMLSR links associated with the LPL mode and the active mode. For example, referring to FIG. 4D, first node 402 may identify (at 453) a second set of EMLSR links (one or more EMLSR links. Although not shown, in some embodiments, first set of EMLSR links 702 may include only a single link. As shown in FIG. 7, second set of EMLSR links 704 may include a second low-power link (Link 2) and a second high-power link (Link 2).

At 1106, the wireless device may transmit a first indication of the first set of EMLSR links or the first and second sets of EMLSR links. For example, referring to FIG. 4D, first node 402 may transmit (at 455) a first indication of the first set of EMLSR links 702 or the first and second sets of EMLSR links 702, 704. Referring to FIG. 8, the present disclosure enables an indication of the first set of EMLSR links 702 or the first set of EMLSR links 702 and the second set of EMLSR links 704 in EMLSR link bitmap subfield 800. For example, the EML control field (not shown) can be changed to include a "Number of EMLSR links" subfield 802, which may indicate multiple EMLSR links are set up for the non-AP MLD (e.g., first node 402). Each set of EMLSR links includes one or multiple links, which are indicated by the subfields, e.g., EMLSR link bitmap for links_1 804*a*, EMLSR link bitmap for links_2 804*b*, . . . , EMLSR link bitmap for links_n 804*n*. Here, n stands for the total number of sets of EMLSR links indicated in the number of EMLSR links subfield 802. In this embodiment, first node 402 may generate a frame with an EMLSR link bitmap subfield 800 (first indication) that indicates first set of EMLSR links 702 and second set of EMLSR links 704.

At 1108, the wireless device may receive a second indication of a first link from the first set of EMLSR links or an indication of the first link from the first set of EMLSR links and a second link from the second set of EMLSR links. For example, referring to FIG. 4D, when multiple links are indicated, second node 404 may select (at 459) a first EMLSR link from first set of EMLSR links 702 or a first EMLSR link from first set of EMLSR links 702 and a second EMLSR link from second set of EMLSR links 704. Second node 404 may transmit (at 463) a second indication of the selected EMLSR link(s), which are received by first node 402.

At 1110, the wireless device may perform packet exchange with a second node using the first link or the first link and the second link. For example, referring to FIG. 4D, first node 402, and second node 404 may perform (at 465) packet exchange using the EMLSR link(s) during LPL mode and active mode. When two links are indicated, concurrent Tx/Rx operations may be performed during LPL mode and/or active mode.

Figure 12A:
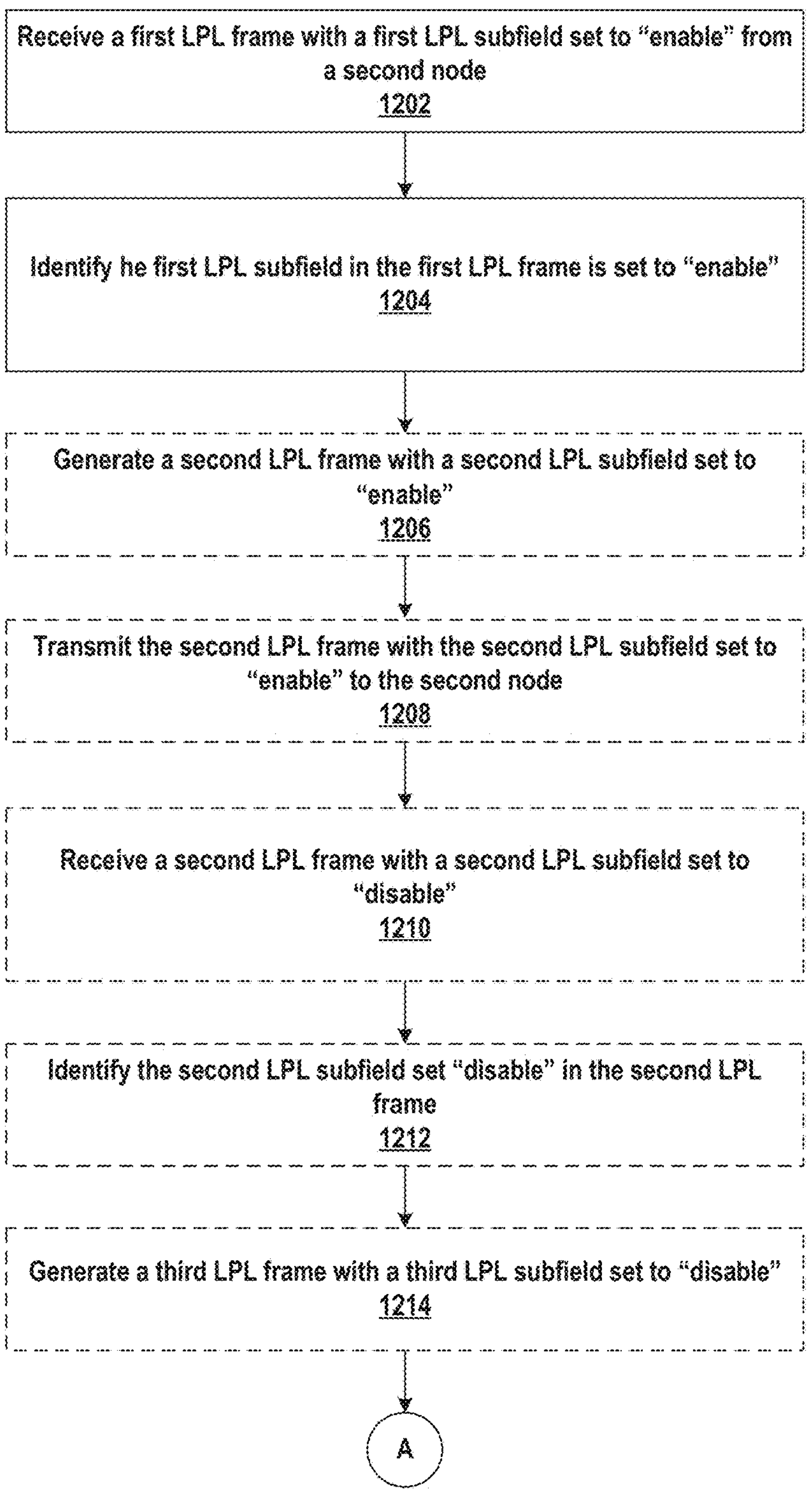
FIGS. 12A and 12B illustrate a flowchart of a third exemplary method for wireless communication, according to some embodiments of the present disclosure.
Figure 12B:
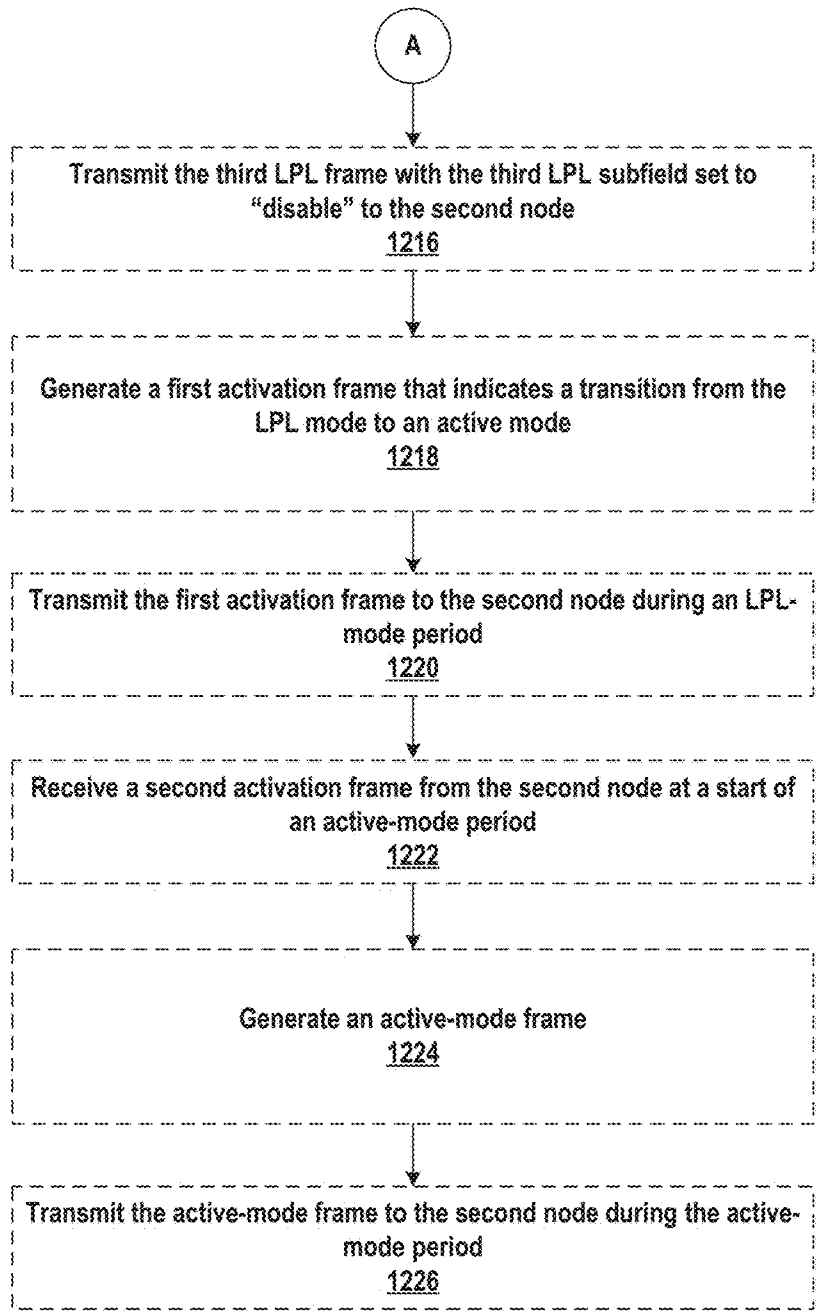

FIGS. 12A and 12B illustrate a flowchart of a third exemplary method 1200 of wireless communication, according to embodiments of the disclosure. Third method 1200 may be performed by a wireless device, e.g., such as AP 140, node 200, apparatus 300, wireless receiver 302, LPL-mode component 320, active-mode component 322, second node 404, or an AP STA, just to name a few. Third method 1200 may include steps 1202-1226 as described below. It is to be appreciated that some of the steps may be optional, and some of the steps may be performed simultaneously, or in a different order than shown in FIGS. 12A and 12B.

Referring to FIG. 12A, at 1202, the wireless device may receive a first LPL frame with a first LPL subfield set to "enable" from a second node. For example, referring to FIG. 4A, first node 402 may transmit (at 403) the first LPL frame, which is received by second node 404.

At 1204, the wireless device may identify he first LPL subfield in the first LPL frame is set to "enable." For example, referring to FIG. 4A, second node 404 may identify (at 405) LPL subfield 502 is set to "enable."

At 1206, the wireless device may generate a second LPL frame with a second LPL subfield set to "enable." For example, referring to FIG. 4A, second node 404 may generate (at 407) a second LPL frame with its LPL subfield set to "enable."

At 1208, the wireless device may transmit the second LPL frame with the second LPL subfield set to "enable" to the second node. For example, referring to FIG. 4A, second node 404 may transmit (at 409) the second LPL frame to first node 402.

At 1210, the wireless device may receive a second LPL frame with a second LPL subfield set to "disable." For example, referring to FIG. 4B, first node 402 may transmit (at 417) the third LPL frame, which is received by second node 404.

At 1212, the wireless device may identify the second LPL subfield set "disable" in the second LPL frame. For example, referring to FIG. 4B, second node 404 may identify (at 419) the LPL subfield in the third LPL frame is set to "disable."

At 1214, the wireless device may generate a third LPL frame with a third LPL subfield set to "disable." For example, referring to FIG. 4B, second node 404 may generate (at 421) a fourth LPL frame with its LPL subfield set to "disable."

Referring to FIG. 12B, at 1216, the wireless device may transmit the third LPL frame with the third LPL subfield set to "disable" to the second node. For example, referring to FIG. 4B, second node 404 may transmit (at 423) the fourth LPL frame to first node 402.

At 1218, the wireless device may generate a first activation frame that indicates a transition from the LPL mode to an active mode. For example, referring to FIG. 4C, to cause first node 402 to transition to active mode without tearing down the LPL mode, second node 404 may generate (at 429) an activation frame. The activation frame may be generated based on the information included in padding-duration subfield 508 in the first LPL frame. Referring to FIG. 6, as mentioned above, the activation frame may include an MU-RTS frame 601*a* with padding-duration 601*b*.

At 1220, the wireless device may transmit the first activation frame to the second node during an LPL-mode period. For example, referring to FIG. 4C, second node 404 may transmit (at 431) the activation frame to first node 402.

At 1222, the wireless device may receive a second activation frame from the second node at a start of an active-mode period. For example, referring to FIG. 4C, First node 402 may transmit (at 435) a second activation frame, which is received by second node 404.

At 1224, the wireless device may generate an active-mode frame. For example, referring to FIG. 4C, during active period 620, second node 404 may generate (at 437) an active-mode frame, such as a physical layer protocol data unit (PPDU) 605 in FIG. 6.

At 1226, the wireless device may transmit the active-mode frame to the second node during the active-mode period. For example, referring to FIG. 4C, second node 404 may transmit (at 439) the active-mode frame to first node 402 with a larger MCS, larger throughput, and/or larger bandwidth than communications send during an LPL period 610.

Figure 13:
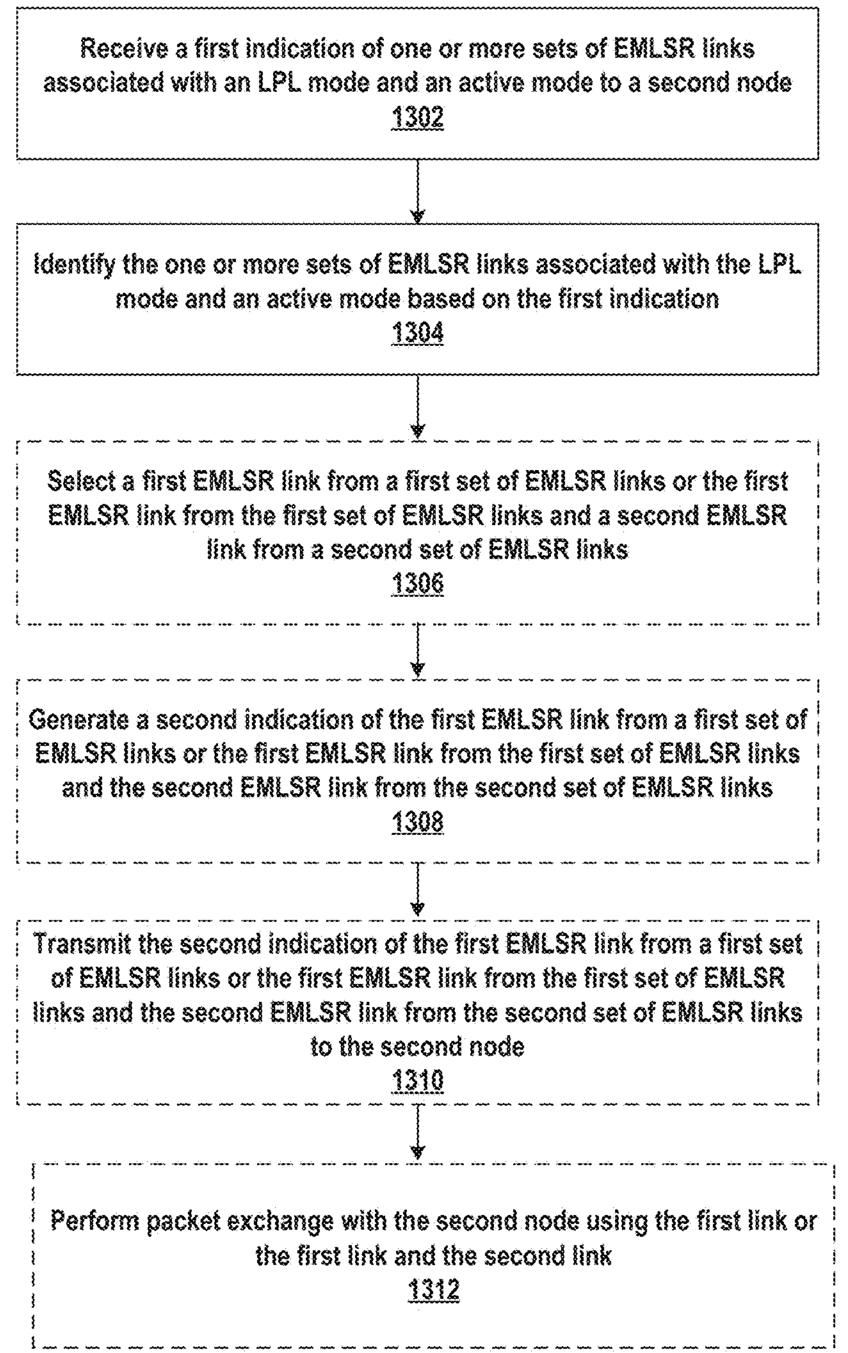
FIG. 13 illustrates a flowchart of a fourth exemplary method for wireless communication, according to some embodiments of the present disclosure.

FIG. 13 illustrates a flowchart of a fourth exemplary method 1300 of wireless communication, according to embodiments of the disclosure. Fourth method 1300 may be performed by a wireless device, e.g., such as AP 140, node 200, apparatus 300, wireless receiver 302, LPL-mode component 320, active-mode component 322, second node 404, or an AP STA, just to name a few. Fourth method 1300 may include steps 1302-1312 as described below. It is to be appreciated that some of the steps may be optional, and some of the steps may be performed simultaneously, or in a different order than shown in FIG. 13.

Referring to FIG. 13, at 1302, the wireless device may receive a first indication of one or more sets of EMLSR links associated with an LPL mode and an active mode to a second node. For example, referring to FIG. 4D, first node 402 may transmit (at 455) a first indication of the first set of EMLSR links 702 or the first and second sets of EMLSR links 702, 704, which is received by second node 404. Referring to FIG. 8, the present disclosure enables an indication of the first set of EMLSR links 702 or the first set of EMLSR links 702 and the second set of EMLSR links 704 in EMLSR link bitmap subfield 800. For example, the EML control field (not shown) can be changed to include a "Number of EMLSR links" subfield 802, which may indicate multiple EMLSR links are set up for the non-AP MLD (e.g., first node 402). Each set of EMLSR links includes one or multiple links, which are indicated by the subfields, e.g., EMLSR link bitmap for links_1 804*a*, EMLSR link bitmap for links_2 804*b*, . . . , EMLSR link bitmap for links_n 804*n*. Here, n stands for the total number of sets of EMLSR links indicated in the number of EMLSR links subfield 802. In this embodiment, first node 402 may generate a frame with an EMLSR link bitmap subfield 800 (first indication) that indicates first set of EMLSR links 702 and second set of EMLSR links 704.

At 1304, the wireless device may identify the one or more sets of EMLSR links associated with the LPL mode and an active mode based on the first indication. For example, referring to FIG. 4D, second node 404 may identify (at 457) the one or more EMLSR links in each set based on the information in EMLSR link bitmap subfield 800.

At 1306, the wireless device may select a first EMLSR link from a first set of EMLSR links or the first EMLSR link from the first set of EMLSR links and a second EMLSR link from a second set of EMLSR links. For example, referring to FIG. 4D, second node 404 may select (at 459) a first EMLSR link from first set of EMLSR links 702 or a first EMLSR link from first set of EMLSR links 702 and a second EMLSR link from second set of EMLSR links 704.

At 1308, the wireless device may generate a second indication of the first EMLSR link from a first set of EMLSR links or the first EMLSR link from the first set of EMLSR links and the second EMLSR link from the second set of EMLSR links. For example, referring to FIG. 4D, a second indication of the selected EMLSR link(s) may be generated (at 461) by second node 404.

At 1310, the wireless device may transmit the second indication of the first EMLSR link from a first set of EMLSR links or the first EMLSR link from the first set of EMLSR links and the second EMLSR link from the second set of EMLSR links to the second node. For example, referring to FIG. 4D, second node 404 may transmit (at 463) a second indication of the selected EMLSR link(s).

At 1312, the wireless device may perform packet exchange with the second node using the first link or the first link and the second link. For example, referring to FIG. 4D, first node 402, and second node 404 may perform (at 465) packet exchange using the EMLSR link(s) during LPL mode and active mode. The packet exchange may include monitoring the selected EMLSR link(s).

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 200 in FIG. 2. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method of wireless communication of a first node is provided. The method may include generating, by at least one processor, a first LPL frame with a first LPL subfield set to "enable." The method may include transmitting, by a communication interface, the first LPL frame with the first LPL subfield set to "enable" to a second node. The method may include enabling, by the at least one processor, an LPL mode after the first LPL frame with the first LPL subfield set to "enable" is transmitted to the second node.

In some embodiments, the method may include receiving, by the communication interface, a second LPL frame with a second LPL subfield set to "enable" from the second node. In some embodiments, the method may include identifying, by the at least one processor, the second LPL subfield in the second LPL frame received from the second node is set to "enable." In some embodiments, the enabling, by the at least one processor, the LPL mode after the first LPL frame with the first LPL subfield set to "enable" is transmitted to the second node may include, in response to transmitting the first LPL frame with the first LPL subfield set to "enable to the second node, enabling the LPL mode. In some embodiments, the enabling, by the at least one processor, the LPL mode after the first LPL frame with the first LPL subfield set to "enable" is transmitted to the second node may include, in response to identifying the second LPL subfield in the second LPL frame received from the second node is set to enable, enabling the LPL mode.

In some embodiments, the method may include generating, by the at least one processor, a second LPL frame with a second LPL subfield set to "disable." In some embodiments, the method may include transmitting, by the communication interface, the second LPL frame with the second LPL subfield set to "disable" to the second node. In some embodiments, the method may include disabling, by the at least one processor, the LPL mode after the second LPL frame with the second LPL subfield set to "disable" is transmitted to the second node.

In some embodiments, the method may include receiving, by the communication interface, a third LPL frame with a third LPL subfield set to "disable" from the second node. In some embodiments, the method may include identifying, by the at least one processor, the third LPL subfield in the second LPL frame received from the second node is set to "disable." In some embodiments, the disabling, by the at least one processor, the LPL mode after the second LPL frame with the second LPL subfield set to "disable" is transmitted to the second node may include, in response to transmitting the second LPL frame with the second LPL subfield set to "disable" to the second node, disabling the LPL mode. In some embodiments, the disabling, by the at least one processor, the LPL mode after the second LPL frame with the second LPL subfield set to "disable" is transmitted to the second node may include, in response to identifying the third LPL subfield in the third LPL frame received from the second node is set to "disable," disabling the LPL mode.

In some embodiments, the generating, by the at least one processor, the first LPL frame with the first LPL subfield set to "enable" may include setting a supported-BW subfield of the first LPL frame to indicate a maximum BW supported by the first node for LPL-mode communication with the second node. In some embodiments, the generating, by the at least one processor, the first LPL frame with the first LPL subfield set to "enable" may include setting a supported-MCS subfield of the first LPL frame to indicate a maximum MCS supported by the first node for the LPL-mode communication with the second node. In some embodiments, the generating, by the at least one processor, the first LPL frame with the first LPL subfield set to "enable" may include setting a padding subfield of the first LPL frame to indicate an amount of padding to include in an active-mode frame. In some embodiments, the generating, by the at least one processor, the first LPL frame with the first LPL subfield set to "enable" may include setting a transition duration subfield of the first LPL frame to indicate a duration associated with a transition from the active mode to the LPL mode by the first node.

In some embodiments, the method may further include receiving, by the communication interface, a first activation frame from the second node during an LPL-mode period, the first activation frame indicating a transition from the LPL mode to an active mode, the first activation frame including an amount of padding. In some embodiments, the first activation frame may indicate a transition from the LPL mode to an active mode, the first activation frame including the amount of padding indicated in the padding subfield of the first LPL frame. In some embodiments, the method may further include generating, by the at least one processor, a second activation frame associated with active mode communication. In some embodiments, the method may further include transmitting, by the communication interface, the second activation frame to the second node at a start of an active-mode period. In some embodiments, the method may further include receiving, by the communication interface, an active-mode frame from the second node during the active-mode period.

In some embodiments, the first activation frame may be an RTS frame. In some embodiments, the second activation frame may be a CTS frame.

According to another aspect of the present disclosure, a method of wireless communication of a first node is provided. The method may include identifying, by at least one processor, a first set of enhanced EMLSR links associated with an LPL mode and an active mode. The method may include transmitting, by the communication interface, a first indication of the first set of EMLSR links associated with the LPL mode and the active mode to the second node.

In some embodiments, the method may include generating, by the at least one processor, a frame with an EMLSR link bitmap subfield that indicates a number of EMLSR links in the first set of EMLSR links.

In some embodiments, the number of EMLSR links in the first set of EMLSR links may include a single link, and the EMLSR link bitmap subfield includes only one bit set to 1.

In some embodiments, the number of EMLSR links in the first set of EMLSR links may include a first EMLSR link and a second EMLSR link, and the EMLSR link bitmap subfield includes multiple bits set to 1.

In some embodiments, the method may include receiving, by the communication interface, a second indication that the first EMLSR link will be used for LPL-mode communication and active-mode communication.

In some embodiments, the method may include monitoring, by the at least one processor, the first EMLSR link during the LPL mode and the active mode.

In some embodiments, the method may further include identifying, by the at least one processor, a second set of enhanced EMLSR links associated with the LPL mode and the active mode. In some embodiments, the first indication may include the first set of EMLSR links and the second set of EMLSR links.

In some embodiments, the method may further include receiving, by the communication interface, a third indication of a first EMLSR link of the first set of EMLSR links and a second link of the second set of EMLSR links associated with concurrent reception and transmission.

According to a further aspect of the present disclosure, an apparatus for wireless communication of a first node is provided. The apparatus may include at least one processor. The apparatus may include memory storing instructions. The memory storing instructions, which when executed by the at least one processor, may cause the at least one processor to generate a first LPL frame with a first LPL subfield set to "enable." The memory storing instructions, which when executed by the at least one processor, may cause the at least one processor to transmit the first LPL frame with the first LPL subfield set to "enable" to a second node. The memory storing instructions, which when executed by the at least one processor, may cause the at least one processor to enable an LPL mode after the first LPL frame with the first LPL subfield set to "enable" is transmitted to the second node.

In some embodiments, the memory storing instructions, which when executed by the at least one processor, may further cause the at least one processor to receive a second LPL frame with a second LPL subfield set to "enable" from the second node. In some embodiments, the memory storing instructions, which when executed by the at least one processor, may further cause the at least one processor to identify the second LPL subfield in the second LPL frame received from the second node is set to "enable." In some embodiments, to enter the LPL mode after the first LPL frame with the first LPL subfield set to "enable" is transmitted to the second node, the memory storing instructions, which when executed by the at least one processor, may further cause the at least one processor to, in response to transmitting the first LPL frame with the first LPL subfield set to "enable to the second node, enable the LPL mode. In some embodiments, to enter the LPL mode after the first LPL frame with the first LPL subfield set to "enable" is transmitted to the second node, the memory storing instructions, which when executed by the at least one processor, may further cause the at least one processor to, in response to identifying the second LPL subfield in the second LPL frame received from the second node is set to enable, enable the LPL mode.

In some embodiments, the memory storing instructions, which when executed by the at least one processor, may further cause the at least one processor to generate a second LPL frame with a second LPL subfield set to "disable." In some embodiments, the memory storing instructions, which when executed by the at least one processor, may further cause the at least one processor to transmit the second LPL frame with the second LPL subfield set to "disable" to the second node. In some embodiments, the memory storing instructions, which when executed by the at least one processor, may further cause the at least one processor to disable the LPL mode after the second LPL frame with the second LPL subfield set to "disable" is transmitted to the second node.

In some embodiments, the memory storing instructions, which when executed by the at least one processor, may further cause the at least one processor to receive a third LPL frame with a third LPL subfield set to "disable" from the second node. In some embodiments, the memory storing instructions, which when executed by the at least one processor, may further cause the at least one processor to identify the third LPL subfield in the second LPL frame received from the second node is set to "disable." In some embodiments, to disable the LPL mode after the second LPL frame with the second LPL subfield set to "disable" is transmitted to the second node, the memory storing instructions, which when executed by the at least one processor, may further cause the at least one processor to, in response to transmitting the second LPL frame with the second LPL subfield set to "disable" to the second node, disabling the LPL mode. In some embodiments, to disable the LPL mode after the second LPL frame with the second LPL subfield set to "disable" is transmitted to the second node, the memory storing instructions, which when executed by the at least one processor, may further cause the at least one processor to, in response to identifying the third LPL subfield in the third LPL frame received from the second node is set to "disable," disable the LPL mode.

In some embodiments, the memory storing instructions, which when executed by the at least one processor, may further cause the at least one processor to set a supported-BW subfield of the first LPL frame to indicate a maximum BW supported by the first node for LPL-mode communication with the second node. In some embodiments, the memory storing instructions, which when executed by the at least one processor, may further cause the at least one processor to set a supported-MCS subfield of the first LPL frame to indicate a maximum MCS supported by the first node for the LPL-mode communication with the second node. In some embodiments, the memory storing instructions, which when executed by the at least one processor, may further cause the at least one processor to set a padding subfield of the first LPL frame to indicate an amount of padding to include in an active-mode frame. In some embodiments, the memory storing instructions, which when executed by the at least one processor, may further cause the at least one processor to set a transition duration subfield of the first LPL frame to indicate a duration associated with a transition from the active mode to the LPL mode by the first node.

In some embodiments, the memory storing instructions, which when executed by the at least one processor, may further cause the at least one processor to receive a first activation frame from the second node during an LPL-mode period. In some embodiments, the first activation frame may indicate a transition from the LPL mode to an active mode, the first activation frame including the amount of padding indicated in the padding subfield of the first LPL frame. In some embodiments, the memory storing instructions, which when executed by the at least one processor, may further cause the at least one processor to generate a second activation frame associated with active mode communication. In some embodiments, the memory storing instructions, which when executed by the at least one processor, may further cause the at least one processor to transmit the second activation frame to the second node at a start of an active-mode period. In some embodiments, the memory storing instructions, which when executed by the at least one processor, may further cause the at least one processor to receive an active-mode frame from the second node during the active-mode period.

According to still another aspect of the present disclosure, a method of wireless communication of a first node is provided. The method may include receiving, by a communication interface, a first LPL frame with a first LPL subfield set to "enable" from a second node. The method may include identifying, by at least one processor, the first LPL subfield in the first LPL frame is set to "enable."

In some embodiments, the method may include generating, by the at least one processor, a second LPL frame with a second LPL subfield set to "enable." In some embodiments, the method may include transmitting, by the communication interface, the second LPL frame with the second LPL subfield set to "enable" to the second node.

In some embodiments, the method may include receiving, by the at least one processor, a second LPL frame with a second LPL subfield set to "disable." In some embodiments, the method may include identifying, by the at least one processor, the second LPL subfield set "disable" in the second LPL frame. In some embodiments, the method may include generating, by the at least one processor, a third LPL frame with a third LPL subfield set to "disable." In some embodiments, the method may include transmitting, by the communication interface, the third LPL frame with the third LPL subfield set to "disable" to the second node.

In some embodiments, the first LPL frame may further include a supported-BW subfield of the first LPL frame that indicates a maximum BW supported by the first node for LPL-mode communication with the second node. In some embodiments, the first LPL frame may further include a supported-MCS subfield of the first LPL frame that indicates a maximum MCS supported by the first node for the LPL-mode communication with the second node. In some embodiments, a padding subfield of the first LPL frame may indicate an amount of padding to include in an active-mode frame. In some embodiments, a transition duration subfield of the first LPL frame may indicate a duration associated with a transition from the active mode to the LPL mode by the first node.

In some embodiments, the method may further include generating, by the at least one processor, a first activation frame that indicates a transition from the LPL mode to an active mode, the first activation frame including the amount of padding indicated in the padding subfield of the first LPL frame. In some embodiments, the method may further include transmitting, by the at least one processor, the first activation frame to the second node during an LPL-mode period.

In some embodiments, the method may further include receiving, by the communication interface, a second activation frame from the second node at a start of an active-mode period. In some embodiments, the method may further include generating, by the at least one processor, an active-mode frame. In some embodiments, the method may further include transmitting, by the communication interface, the active-mode frame to the second node during the active-mode period.

In some embodiments, the first activation frame may be an RTS frame. In some embodiments, the second activation frame may be a CTS frame.

According to still a further aspect of the present disclosure, a method of wireless communication of a first node is provided. The method may include receiving, by the communication interface, a first indication of one or more sets of EMLSR links associated with a LPL mode and an active mode to a second node. The method may include identifying, by at least one processor, the one or more sets of EMLSR links associated with the LPL mode and the active mode based on the first indication.

In some embodiments, the method may further include selecting, by the at least one processor, a first EMLSR link from a first set of EMLSR links or the first EMLSR link from the first set of EMLSR links and a second EMLSR link from a second set of EMLSR links. In some embodiments, the method may include generating, by the at least one processor, a second indication of the first EMLSR link from a first set of EMLSR links or the first EMLSR link from the first set of EMLSR links and the second EMLSR link from the second set of EMLSR links. In some embodiments, the method may include transmitting, by the communication interface, the second indication of the first EMLSR link from a first set of EMLSR links or the first EMLSR link from the first set of EMLSR links and the second EMLSR link from the second set of EMLSR links to the second node.

In some embodiments, a number of EMLSR links in the first set of EMLSR links may include a single link, and the EMLSR link bitmap subfield includes only one bit set to 1.

In some embodiments, a number of EMLSR links in the first set of EMLSR links may include a first EMLSR link and a second EMLSR link, and the EMLSR link bitmap subfield includes multiple bits set to 1.

In some embodiments, the method may further include performing, by the at least one processor, a packet exchange using the first EMLSR link from a first set of EMLSR links or the first EMLSR link from the first set of EMLSR links and the second EMLSR link from the second set of EMLSR links to the second node with the second node.

According to yet another aspect of the present disclosure, an apparatus for wireless communication of a first node is provided. The apparatus may include at least one processor. The apparatus may include memory storing instructions. The memory storing instructions, which when executed by the at least one processor, may cause the at least one processor to receive a first LPL frame with a first LPL subfield set to "enable" from a second node. The memory storing instructions, which when executed by the at least one processor, may cause the at least one processor to identify that the first LPL subfield in the first LPL frame is set to "enable."

In some embodiments, the memory storing instructions, which when executed by the at least one processor, may further cause the at least one processor to generate a second LPL frame with a second LPL subfield set to "enable." In some embodiments, the memory storing instructions, which when executed by the at least one processor, may further cause the at least one processor to transmit the second LPL frame with the second LPL subfield set to "enable" to the second node.

In some embodiments, the memory storing instructions, which when executed by the at least one processor, may further cause the at least one processor to receive a second LPL frame with a second LPL subfield set to "disable." In some embodiments, the memory storing instructions, which when executed by the at least one processor, may further cause the at least one processor to identify the second LPL subfield set "disable" in the second LPL frame. In some embodiments, the memory storing instructions, which when executed by the at least one processor, may further cause the at least one processor to generate a third LPL frame with a third LPL subfield set to "disable." In some embodiments, the memory storing instructions, which when executed by the at least one processor, may further cause the at least one processor to transmit the third LPL frame with the third LPL subfield set to "disable" to the second node.

In some embodiments, the first LPL frame may further include a supported-BW subfield of the first LPL frame that indicates a maximum BW supported by the first node for LPL-mode communication with the second node. In some embodiments, the first LPL frame may further include a supported-MCS subfield of the first LPL frame that indicates a maximum MCS supported by the first node for the LPL-mode communication with the second node. In some embodiments, a padding subfield of the first LPL frame may indicate an amount of padding to include in an active-mode frame. In some embodiments, a transition duration subfield of the first LPL frame may indicate a duration associated with a transition from the active mode to the LPL mode by the first node.

In some embodiments, the memory storing instructions, which when executed by the at least one processor, may further cause the at least one processor to generate a first activation frame that indicates a transition from the LPL mode to an active mode, the first activation frame including the amount of padding indicated in the padding subfield of the first LPL frame. In some embodiments, the memory storing instructions, which when executed by the at least one processor, may further cause the at least one processor to transmit the first activation frame to the second node during an LPL-mode period.

In some embodiments, the memory storing instructions, which when executed by the at least one processor, may further cause the at least one processor to receive a second activation frame from the second node at a start of an active-mode period. In some embodiments, the memory storing instructions, which when executed by the at least one processor, may further cause the at least one processor to generate an active-mode frame.

In some embodiments, the memory storing instructions, which when executed by the at least one processor, may further cause the at least one processor to transmit the active-mode frame to the second node during the active-mode period.

In some embodiments, the first activation frame may be an RTS frame. In some embodiments, the second activation frame may be a CTS frame.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional obstacle blocks illustrating the implementation of specified functions and relationships thereof. The boundaries of these functional obstacle blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted. The breadth and scope of the present disclosure should not be limited by any of the above-described exemplary embodiments, but should be defined only in accordance with the following claims and their equivalents.

What is claimed is:

1. A method of wireless communication of a first node, comprising:

generating, by the first node, a first low-power listening (LPL) frame with a first LPL subfield set to "enable";

transmitting, by the first node, the first LPL frame with the first LPL subfield set to "enable" to a second node; and enabling, by the first node, an LPL mode after the first LPL frame with the first LPL subfield set to "enable" is transmitted to the second node, wherein during the LPL mode, the first node remains awake, the method further comprising:

receiving, by the first node, a second LPL frame with a second LPL subfield set to "enable" from the second node; and identifying, by the first node, the second LPL subfield in the second LPL frame received from the second node is set to "enable", wherein the enabling, by the first node, the LPL mode after the first LPL frame with the first LPL subfield set to "enable" is transmitted to the second node comprises:

in response to transmitting the first LPL frame with the first LPL subfield set to "enable" to the second node, enabling the LPL mode; or in response to identifying the second LPL subfield in the second LPL frame received from the second node is set to "enable", enabling the LPL mode.

2. The method of claim 1, further comprising:

generating, by the first node, a second LPL frame with a second LPL subfield set to "disable";

transmitting, by the first node, the second LPL frame with the second LPL subfield set to "disable" to the second node; and disabling, by the first node, the LPL mode after the second LPL frame with the second LPL subfield set to "disable" is transmitted to the second node.

3. The method of claim 2, further comprising:

receiving, by the first node, a third LPL frame with a third LPL subfield set to "disable" from the second node; and identifying, by the first node, the third LPL subfield in the second LPL frame received from the second node is set to "disable", wherein the disabling, by the first node, the LPL mode after the second LPL frame with the second LPL subfield set to "disable" is transmitted to the second node comprises:

in response to transmitting the second LPL frame with the second LPL subfield set to "disable" to the second node, disabling the LPL mode; or in response to identifying the third LPL subfield in the third LPL frame received from the second node is set to "disable," disabling the LPL mode.

4. The method of claim 1, wherein the generating, by the first node, the first LPL frame with the first LPL subfield set to "enable" comprises at least one of:

setting a supported-bandwidth (BW) subfield of the first LPL frame to indicate a maximum BW supported by the first node for LPL-mode communication with the second node;

setting a supported-modulation and coding scheme (MCS) subfield of the first LPL frame to indicate a maximum MCS supported by the first node for the LPL-mode communication with the second node;

setting a padding subfield of the first LPL frame to indicate an amount of padding to include in an active-mode frame; or setting a transition duration subfield of the first LPL frame to indicate a duration associated with a transition from the active mode to the LPL mode by the first node.

5. The method of claim 1, further comprising:

receiving, by the first node, a first activation frame from the second node during an LPL-mode period, the first activation frame indicating a transition from the LPL mode to an active mode, the first activation frame including an amount of padding;

generating, by the first node, a second activation frame associated with active mode communication;

transmitting, by the first node, the second activation frame to the second node at a start of an active-mode period; and receiving, by the first node, an active-mode frame from the second node during the active-mode period.

6. The method of claim 5, wherein:

the first activation frame is a request-to-send (RTS) frame, and the second activation frame is a clear-to-send (CTS) frame.

7. An apparatus for wireless communication of a first node, comprising:

at least one processor; and memory storing instructions, which when executed by the at least one processor, cause the first node to:

generate a first low-power listening (LPL) frame with a first LPL subfield set to "enable";

transmit the first LPL frame with the first LPL subfield set to "enable" to a second node; and enable an LPL mode after the first LPL frame with the first LPL subfield set to "enable" is transmitted to the second node, wherein during the LPL mode, the first node remains awake, wherein the memory storing instructions, which when executed by the at least one processor, further cause the first node to:

receive a second LPL frame with a second LPL subfield set to "enable" from the second node; and identify the second LPL subfield in the second LPL frame received from the second node is set to "enable,"

wherein, to enter the LPL mode after the first LPL frame with the first LPL subfield set to "enable" is transmitted to the second node, the memory storing instructions, which when executed by the at least one processor, further cause the at least one processor to:

in response to transmitting the first LPL frame with the first LPL subfield set to "enable" to the second node, enable the LPL mode; or in response to identifying the second LPL subfield in the second LPL frame received from the second node is set to "enable", enable the LPL mode.

8. The apparatus of claim 7, wherein the memory storing instructions, which when executed by the at least one processor, further cause the first node to:

generate a second LPL frame with a second LPL subfield set to "disable";

transmit the second LPL frame with the second LPL subfield set to "disable" to the second node; and disable the LPL mode after the second LPL frame with the second LPL subfield set to "disable" is transmitted to the second node.

9. The apparatus of claim 8, wherein the memory storing instructions, which when executed by the at least one processor, further cause the first node to:

receive a third LPL frame with a third LPL subfield set to "disable" from the second node; and identify the third LPL subfield in the second LPL frame received from the second node is set to "disable", wherein, to disable the LPL mode after the second LPL frame with the second LPL subfield set to "disable" is transmitted to the second node, the memory storing instructions, which when executed by the at least one processor, further cause the at least one processor to:

in response to transmitting the second LPL frame with the second LPL subfield set to "disable" to the second node, disable the LPL mode; or in response to identifying the third LPL subfield in the third LPL frame received from the second node is set to "disable," disable the LPL mode.

10. The apparatus of claim 7, wherein, to generate the first LPL frame with the first LPL subfield set to "enable," the memory storing instructions, which when executed by the at least one processor, further cause the first node to:

set a supported-bandwidth (BW) subfield of the first LPL frame to indicate a maximum BW supported by the first node for LPL-mode communication with the second node;

set a supported-modulation and coding scheme (MCS) subfield of the first LPL frame to indicate a maximum MCS supported by the first node for the LPL-mode communication with the second node;

set a padding subfield of the first LPL frame to indicate an amount of padding to include in an active-mode frame; or set a transition duration subfield of the first LPL frame to indicate a duration associated with a transition from the active mode to the LPL mode by the first node.

* * * * *